US012657017B2

(12) United States Patent
Mo et al.

(10) Patent No.: US 12,657,017 B2
(45) Date of Patent: Jun. 16, 2026

(54) UNDOING ACTIONS AND UNINSTALLING APPLICATIONS IN A COMPUTING ENVIRONMENT

(71) Applicant: International Business Machines Corporation, Armonk, NY (US)

(72) Inventors: Ying Mo, Beijing (CN); Yue Chen, Beijing (CN); Rui Liu, Beijing (CN); Ya Xiao, Beijing (CN); Peng Hui Jiang, Beijing (CN); Hu Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 447 days.

(21) Appl. No.: 18/116,916

(22) Filed: Mar. 3, 2023

(65) Prior Publication Data

US 2024/0296034 A1 Sep. 5, 2024

(51) Int. Cl.
| | |
|---|---|
| *G06F 9/44* | (2018.01) |
| *G06F 8/61* | (2018.01) |
| *G06F 9/445* | (2018.01) |
| *G06F 9/45* | (2006.01) |
| *G06F 9/455* | (2018.01) |

(52) U.S. Cl.
CPC ..................................... *G06F 8/62* (2013.01)

(58) Field of Classification Search
CPC ....................................................... G06F 8/62
See application file for complete search history.

(56) References Cited

U.S. PATENT DOCUMENTS

| | | | |
|---|---|---|---|
| 8,060,934 B2 | 11/2011 | Cabuk et al. | |
| 9,569,345 B2 * | 2/2017 | Friedler | .................. G06F 11/22 |
| 9,678,721 B2 | 6/2017 | Hale et al. | |
| 9,836,390 B2 | 12/2017 | Boshernitsan et al. | |

(Continued)

FOREIGN PATENT DOCUMENTS

KR 20220060525 A 5/2022

OTHER PUBLICATIONS

Zhiqiang Xu, DEPCOMM: Graph Summarization on System Audit Logs for Attack Investigation, 2022, pp. 1-18. https://ieeexplore. ieee.org/stamp/stamp.jsp?tp=&arnumber=9833632 (Year: 2022).*

(Continued)

*Primary Examiner* — Mongbao Nguyen
(74) *Attorney, Agent, or Firm* — Scully, Scott, Murphy & Presser, P.C.

(57) ABSTRACT

A computer-implemented method, computer program product, and/or computing system for preforming at least one of a performance group consisting of undoing an action in and uninstalling a software application from a computing environment. The computer-implemented method, computer program product, and/or computing system includes: building an initial resource dependency graph; building a second resource dependency graph; determining a resulting resource dependency graph to identify dangling resources; and removing the dangling resources. In an embodiment, building at least one of the initial resource dependency graph or the second resource dependency graph includes building a resource ownership graph and extending the resource ownership graph to include associations to form a resource dependency graph

20 Claims, 10 Drawing Sheets

(56) References Cited

U.S. PATENT DOCUMENTS

| | | | | |
|---|---|---|---|---|
| 10,698,672 | B1 | 6/2020 | Benskin et al. | |
| 11,222,074 | B2 * | 1/2022 | Ganz | G06F 16/2358 |
| 11,481,399 | B1 * | 10/2022 | Juelich | G06F 16/953 |
| 11,720,333 | B2 * | 8/2023 | Costa, Jr. | G06F 8/457 |
| | | | | 717/154 |
| 11,822,962 | B2 * | 11/2023 | Mohan | G06F 9/5005 |
| 2018/0062953 | A1 | 3/2018 | Billore et al. | |
| 2019/0327154 | A1 * | 10/2019 | Sahoo | H04L 43/045 |
| 2020/0249939 | A1 | 8/2020 | Busayarat et al. | |
| 2021/0224105 | A1 | 7/2021 | Raja Jayaraman et al. | |
| 2021/0224122 | A1 * | 7/2021 | Glass | G06F 9/3836 |
| 2022/0060431 | A1 * | 2/2022 | Vadayadiyil Raveendran | |
| | | | | H04L 43/0852 |
| 2022/0188161 | A1 * | 6/2022 | Mohan | G06F 9/5038 |
| 2022/0321596 | A1 * | 10/2022 | Weizman | H04L 61/4511 |
| 2022/0365835 | A1 * | 11/2022 | Kandasamy | G06F 11/0793 |
| 2023/0115438 | A1 * | 4/2023 | DeGraaf | G06F 9/547 |
| | | | | 707/652 |
| 2023/0127029 | A1 * | 4/2023 | Costa, Jr. | G06F 8/70 |
| | | | | 717/154 |
| 2023/0350661 | A1 * | 11/2023 | Reed | G06F 8/65 |
| 2023/0368055 | A1 * | 11/2023 | Babu | G06N 7/01 |
| 2024/0248691 | A1 * | 7/2024 | Harduf | G06F 8/433 |

OTHER PUBLICATIONS

Thomas Fankhauser, Resource Dependency Processing in WebScaling Frameworks, 2018, pp. 155-167. https://ieeexplore.ieee.org/stamp/stamp.jsp?tp=&arnumber=7464317 (Year: 2018).*

Naser Ezzati-Jivan, DepGraph: Localizing Performance Bottlenecks in Multi-Core Applications Using Waiting Dependency Graphs and Software, 2020, pp. 149-158. https://ieeexplore.ieee.org/stamp/stamp.jsp?tp=&arnumber=9252064 (Year: 2020).*

"Uninstall Cloud Pak for Watson AIOps AI Manager", May 24, 2022, 2 pages https://github.com/IBM/cp4waiops-samples/tree/main/uninstall/3.3.

'Cp4mcm-samples', May 26, 2022, 19 pages https://github.com/IBM/cp4mcm-samples/blob/master/scripts/uninstall.sh.

"delete application did not delete CRDs, nor update them and did not inform about this #6078", Apr. 21, 2021, 5 pages https://github.com/argoproj/argo-cd/issues/6078.

"A way to do something in hook after delete the Argo Application #7575", Oct. 29, 2021, 4 pages https://github.com/argoproj/argo-cd/issues/7575.

"Way to block managed resource from being deleted till its dependency deleted #2439", Jul. 17, 2021, 6 pages https://github.com/crossplane/crossplane/issues/2439.

"Composition Dependency and Ordered Creation #2072", Jan. 12, 2021, 11 pages https://github.com/crossplane/crossplane/issues/2072.

"Garbage Collection", Last modified Jan. 18, 2023, 4 pages https://kubernetes.io/docs/concepts/architecture/garbage-collection/.

"Owners and Dependents", Last modified Oct. 24, 2022, 2 pages https://kubernetes.io/docs/concepts/overview/working-with-objects/owners-dependents/.

'Use Cascading Deletion in a Cluster', Last modified Jan. 11, 2023, 4 pages https://kubernetes.io/docs/tasks/administer-cluster/use-cascading-deletion/.

* cited by examiner

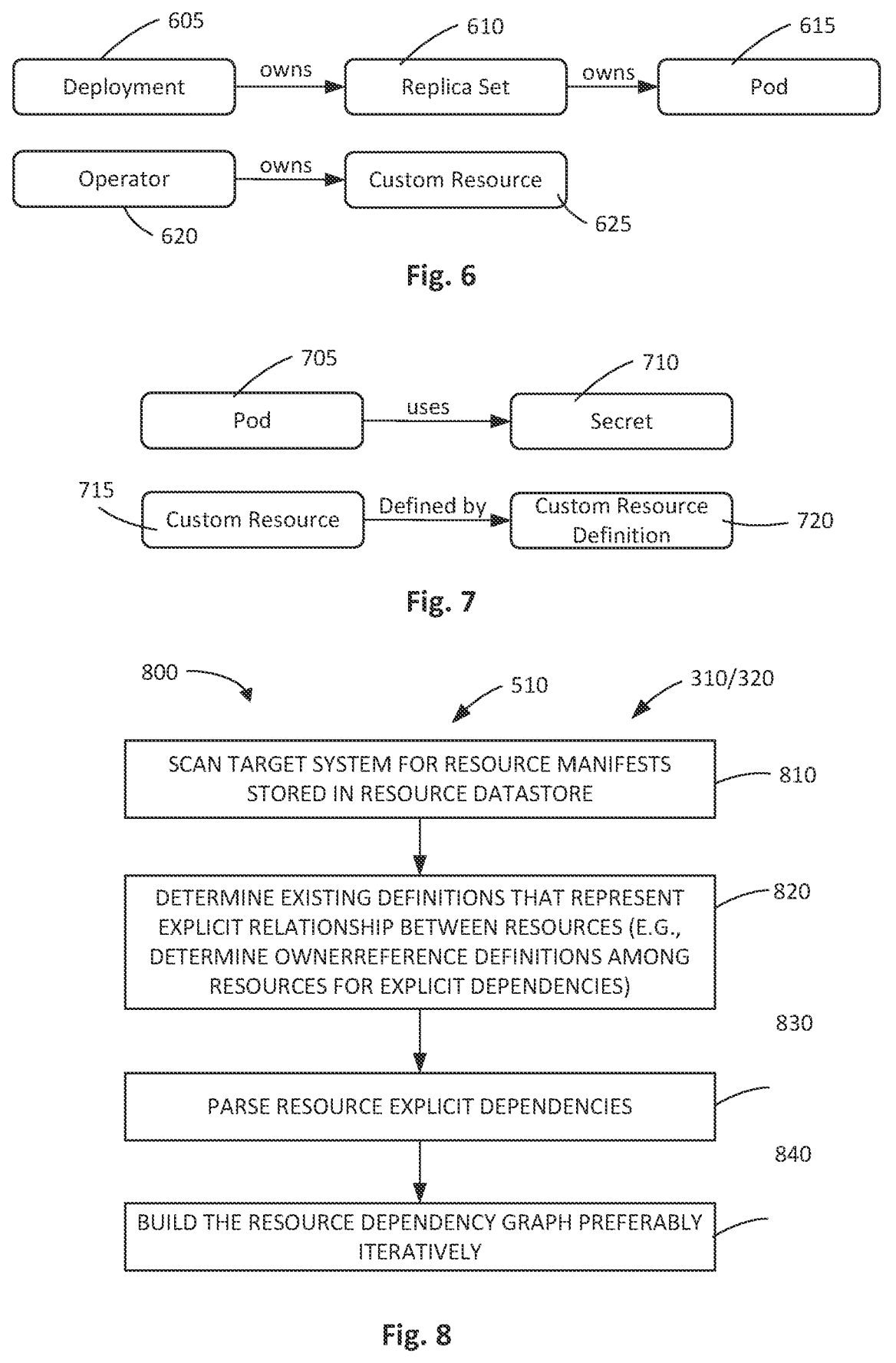

605

610

615

Deployment — owns → Replica Set — owns → Pod

Operator — owns → Custom Resource

Pod — uses → Secret

715

Custom Resource — Defined by → Custom Resource Definition

SCAN TARGET SYSTEM FOR RESOURCE MANIFESTS STORED IN RESOURCE DATASTORE — 810

DETERMINE EXISTING DEFINITIONS THAT REPRESENT EXPLICIT RELATIONSHIP BETWEEN RESOURCES (E.G., DETERMINE OWNERREFERENCE DEFINITIONS AMONG RESOURCES FOR EXPLICIT DEPENDENCIES) — 820

830

PARSE RESOURCE EXPLICIT DEPENDENCIES

840

BUILD THE RESOURCE DEPENDENCY GRAPH PREFERABLY ITERATIVELY

Fig. 8

SCAN CONTAINER LOGS TO FIND OUT ASSOCIATIONS AMONG RESOURCES FOR IMPLICIT DEPENDENCIES — 910

TRACK SERVICE TO SERVICE COMMUNICATON TO DETERMINE ASSOCIATIONS AMONG RESOURCES FOR IMPLICIT DEPENDENCIES — 920

EXTEND THE RESOURCE OWNERSHIP GRAPH TO INCLUDE THE UNCOVERED ASSOCIATIONS — 930

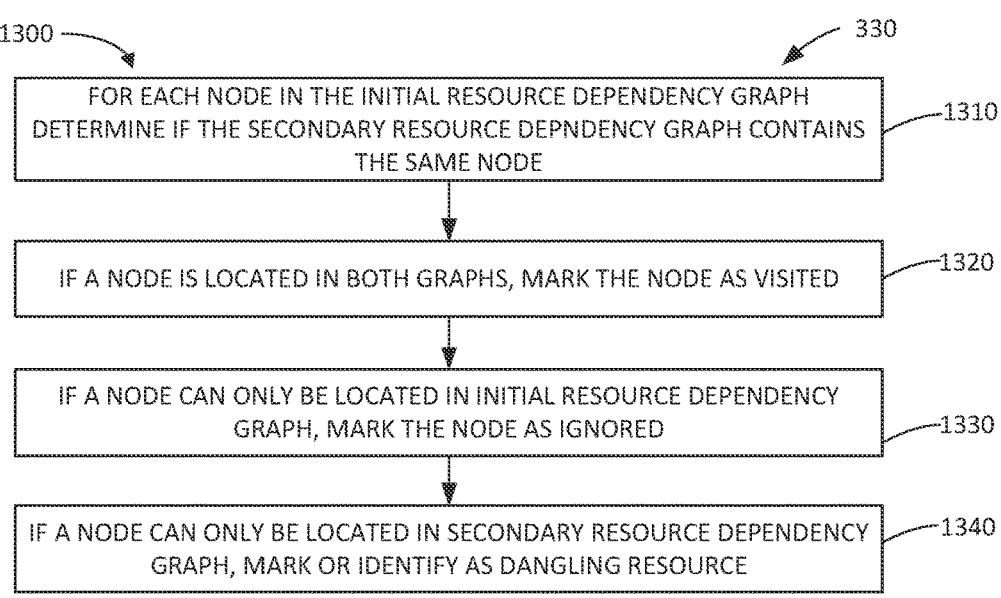

FOR EACH NODE IN THE INITIAL RESOURCE DEPENDENCY GRAPH DETERMINE IF THE SECONDARY RESOURCE DEPNDENCY GRAPH CONTAINS THE SAME NODE ——1310

IF A NODE IS LOCATED IN BOTH GRAPHS, MARK THE NODE AS VISITED ——1320

IF A NODE CAN ONLY BE LOCATED IN INITIAL RESOURCE DEPENDENCY GRAPH, MARK THE NODE AS IGNORED ——1330

IF A NODE CAN ONLY BE LOCATED IN SECONDARY RESOURCE DEPENDENCY GRAPH, MARK OR IDENTIFY AS DANGLING RESOURCE ——1340

Fig. 13

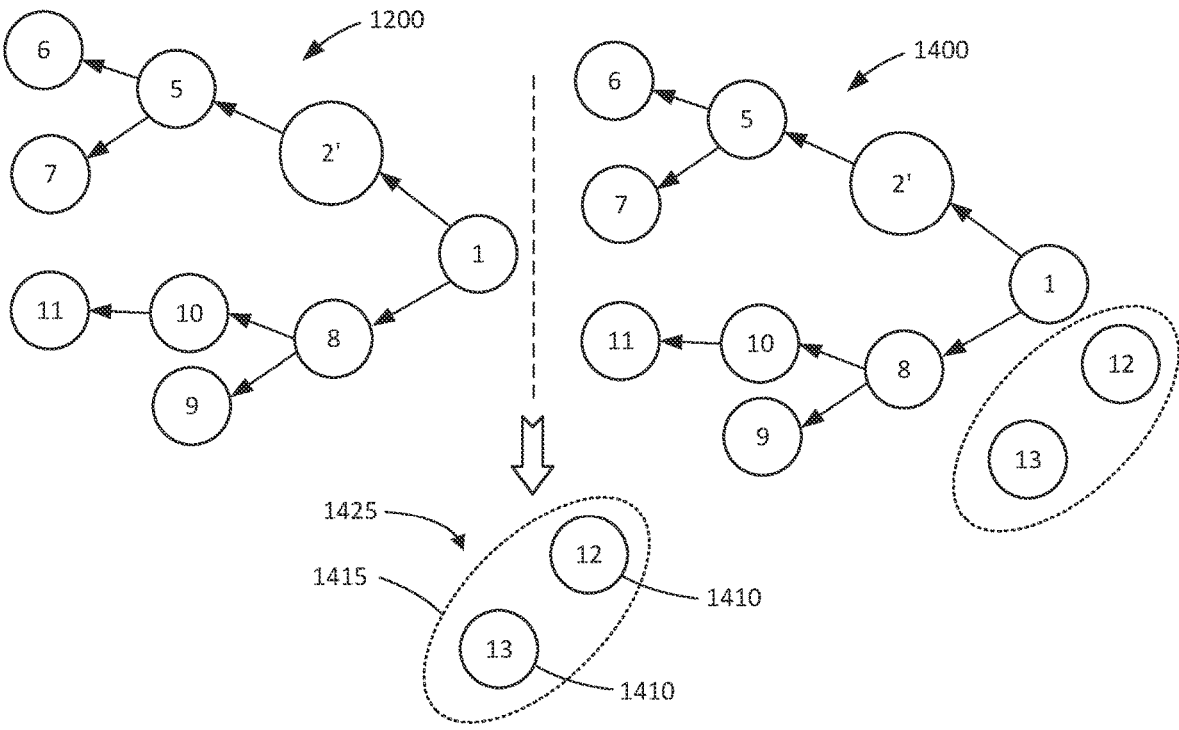

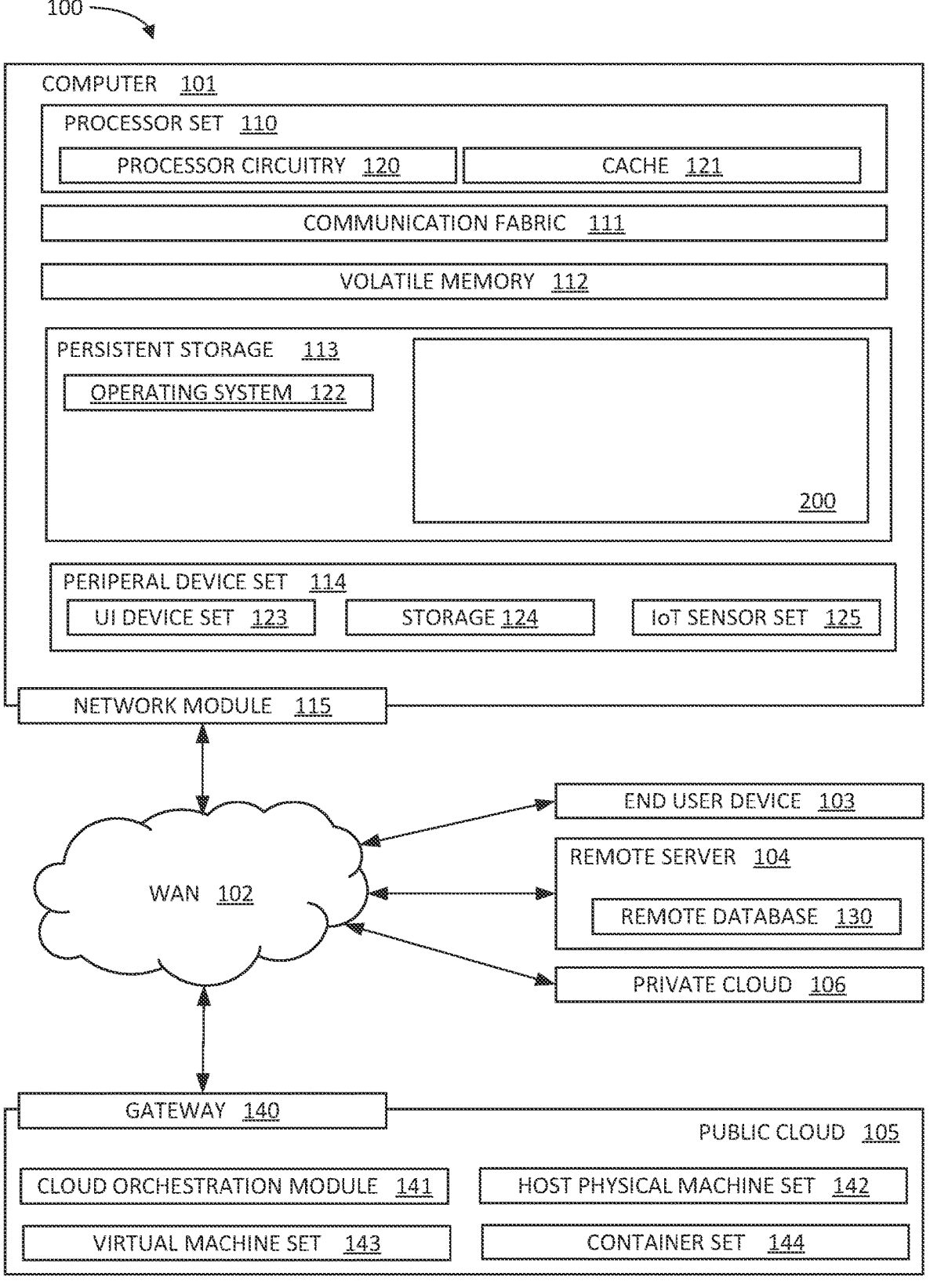

COMPUTER    101

PROCESSOR SET    110

PROCESSOR CIRCUITRY    120          CACHE    121

COMMUNICATION FABRIC    111

VOLATILE MEMORY    112

PERSISTENT STORAGE    113

OPERATING SYSTEM    122

200

PERIPERAL DEVICE SET    114

UI DEVICE SET    123          STORAGE 124          IoT SENSOR SET    125

NETWORK MODULE    115

WAN    102

END USER DEVICE    103

REMOTE SERVER    104

REMOTE DATABASE    130

PRIVATE CLOUD    106

GATEWAY    140

PUBLIC CLOUD    105

CLOUD ORCHESTRATION MODULE    141          HOST PHYSICAL MACHINE SET    142

VIRTUAL MACHINE SET    143          CONTAINER SET    144

Fig. 18

UNDOING ACTIONS AND UNINSTALLING APPLICATIONS IN A COMPUTING ENVIRONMENT

BACKGROUND

The present application relates generally to information handling and/or electronic data processing and analytics, and more particularly to methods, computer systems, and computer program products to undo an action in a computer environment, including for example uninstalling software applications in a computer environment, including uninstalling cloud native software applications in a cloud or distributive computing environment.

With the advancement of information technology and wide use of storing and processing electronic data, more and more demands are being placed on the acquisition, processing, storage, and analyzing electronic data and information by computing systems. As electronic data which is being stored has increased dramatically it is increasingly important to be able to process and analyze that electronic data efficiently. Numerous software applications and programs have been developed in order to process, manage, store, and analyze that electronic data. In addition, cloud computing and/or distributive computing environments and/or systems have been developed and expanded to more efficiently store, manage, process and analyze that data.

To assist with electronic data storage, management, processing and analysis, software applications and programs that are outdated, no longer of use, or otherwise no longer used need to be removed to free up computer storage space and to increase the efficiency of the processing of all that electronic data. A problem exists in that current undo operations in a computing environment and current software application removal or uninstall techniques leave drifts, dangling resources, and remnants of the previous actions and/or software applications, and do not fully remove or undo all the resources during or as a result of the undo operation or the software application uninstall process. These remnants, drifts, dangling resources unnecessarily take up computer memory and make processing less efficient leading to increased power usage, inefficiency, and decreased computing performance. It would be advantageous to have a system, platform, tool, computing environment, computer programming product and technique that more completely removes all remnants, dangling resources, and/or drifts of the computing action or operation to be undone and/or more completely removes all the dangling resources, drifts and/or remnants of the software application being uninstalled or deleted.

SUMMARY

The summary of the disclosure is given to aid understanding of systems, platforms, tools, computer program products and/or techniques of undoing a computing action and/or more completely uninstalling software applications in computing environments and more specifically in one or more embodiments uninstalling cloud native software applications in cloud computing environments, and not with an intent to limit the disclosure or the invention. In one or more approaches, the system, platform, tool, computer program product, and/or technique more completely undoes an action, including in an embodiment more completely removing all remnants, dangling resources, or drifts associated with a software application (e.g., a cloud native software application) that is or is being uninstalled.

The present disclosure is directed to a person of ordinary skill in the art, and it should be understood that various aspects and features of the disclosure may advantageously be used separately in some instances, or in combination with other aspects and features of the disclosure in other instances. Accordingly, variations and modifications may be made to the systems, platforms, tools, computer program products, techniques, and/or methods for undoing a computing action and/or uninstalling software applications including cloud native software applications in computing environments preferably in a manner that does not leave any drifts, dangling resources, or remnants of the software application on the computing environment to achieve different effects. By more completely undoing the action and/or uninstalling a computing application, the computing system can advantageously have additional memory space freed up for other computing applications or to store other data, the computing system can run more efficiently, perform faster (less latency), and/or use less power.

A system, platform, computer program product, and/or technique according to one or more embodiments for undoing an action in a computing environment including in an approach uninstalling a software application or program in a more complete manner, where, for example, dangling resources, drifts, and/or remnants of the action and/or software application are more completely removed from the computing environment than in the past are disclosed. The computer-implemented method, computer program product, and/or system includes in an embodiment building an initial resource dependency graph. The computer-implemented method, computer program product, and/or system includes in an arrangement building a second resource dependency graph. In an embodiment, the computer-implemented method, computer program product, and/or system includes determining a resulting resource dependency graph to identify dangling resources. The computer-implemented method, computer program product, and/or system includes in an embodiment also includes removing the dangling resources. In an approach, removing dangling resources is performed hierarchically where dependent dangling resources that are dependent upon other resources are removed before the other resources. Building at least one of the initial resource dependency graph or the second resource dependency graph in an embodiment includes building a resource ownership graph and extending the resource ownership graph to include associations to form a resource dependency graph. Extending the resource ownership graph to include associations and/or implicit associations advantageously provides a more extensive identification of resources used by or during the action to be undone and the application to be uninstalled.

Building a resource ownership graph in an embodiment includes scanning a target system in the computing environment for resource manifests stored in a resource datastore, determining existing definitions that represent explicit relationships between resources, parsing resource explicit dependencies, and building the resource ownership graph, preferably iteratively. In an embodiment, extending the resource ownership graph to include associations to form a resource dependency graph includes scanning container logs to identify associations among resources for implicit dependencies, tracking service to service communications to identify associations among resources for implicit dependencies, and extending the resource ownership graph to include the identified associations to form the resource dependency graph.

In an aspect, determining a resulting resource dependency graph to identify dangling resources includes comparing the initial resource dependency graph to the second resource dependency graph. Determining a resulting resource dependency graph to identify dangling resources in an embodiment includes for each node in the initial resource dependency graph determine if the second resource dependency graph contains the same node; and for each node located in both the initial and second resource dependency graph, mark the node as visited; for each node located only in the initial resource dependency graph, mark the node as ignored; and for each node located only in the second resource graph, identify the node as a dangling resource, wherein the dangling resources form the resulting resource dependency graph. Removing the dangling resources includes in an approach identifying a leaf node in the resulting resource dependency graph; deleting the identified leaf node in the resulting resource dependency graph; in response to the identified leaf node being successfully deleted, mark the identified leaf node as deleted and in response to the identified leaf node not being successfully deleted, mark the identified leaf node as failed. In an embodiment, determine whether there are any more nodes remaining in the resulting resource dependency graph; in response to there being one or more nodes remaining in the resulting resource dependency graph, determine whether any of the one or more remaining nodes are leaf nodes; in response to there being remaining leaf nodes, delete a next available remaining leaf node; in response to there being no remaining leaf nodes, delete a next available non-leaf node; and in response to there being no remaining leaf nodes and no remaining non-leaf nodes, end the process of removing dangling resources.

In an aspect, building the initial resource dependency graph is performed before at least one of the performance of the action or the installation of the software application. In a further aspect, building the second resource dependency graph is performed according to at least one of a triggering group consisting of: after the performance of an undo operation that undoes the action, before an uninstall operation to remove the software application, and after the uninstall operation to remove the software application. The resource dependency graphs in an embodiment are built without user interruption or code modification. In an embodiment, dangling resources are removed by traversing the resulting resource dependency graph without a user specifying the order of removing the dangling resources.

The foregoing and other objects, features and advantages of the invention will be apparent from the following more particular descriptions of exemplary embodiments of the invention as illustrated in the accompanying drawings.

BRIEF DESCRIPTION OF THE DRAWINGS

The various aspects, features, and embodiments of methods, techniques, computer program products, platforms, tools, and/or systems for performing an undo operation (e.g., undoing a certain action in a computing environment) and/or uninstalling or removing software applications from a computing environment, including removing cloud native applications from a distributive computing system, will be better understood when read in conjunction with the figures provided. It may be noted that a numbered element in the figures is typically numbered according to the figure in which the element is introduced, is typically referred to by that number throughout succeeding figures, and that like reference numbers generally represent like parts of exemplary embodiments of the invention.

Embodiments are provided in the figures for the purpose of illustrating aspects, features, and/or various embodiments of the methods, techniques, products, computer program products, platforms, tools and/or systems for performing an undo operation in a computing environment including in an embodiment removing or uninstalling software applications or programs from computing environments, including removing cloud native applications from distributed computing systems, but the claims should not be limited to the precise arrangement, structures, features, aspects, assemblies, subassemblies, systems, platforms, circuitry, functional units, programming, instructions, code, embodiments, methods, processes, or devices shown. The arrangements, structures, features, aspects, assemblies, subassemblies, systems, platforms, circuitry, functional units, programming, instructions, embodiments, methods, processes, and/or devices shown may be used singularly or in combination with other arrangements, structures, features, aspects, assemblies, subassemblies, systems, circuitry, functional units, programming, instructions, code, methods, processes, and/or devices.

FIG. 6 is a diagram showing example resource ownership relationships, according to an embodiment of the present disclosure.

FIG. 7 is a diagram showing example resource association relationships, according to an embodiment of the present disclosure.

FIG. 8 shows a flow chart of a process for building an ownership resource dependency graph, according to an embodiment of the present disclosure.

FIG. 13 shows a flow chart of a process for determining dangling resources including in an embodiment creating a resulting (marked) resource dependency graph according to an embodiment of the present disclosure.

FIG. 14 is a diagrammatic representation of the process of creating a resulting (marked) resource dependency graph, according to an embodiment of the disclosure.

FIG. 18 depicts an example computing environment for execution of at least some of the computer code involved in performing an undo action in a computing environment including uninstalling a software application from a computing environment according to an embodiment of the disclosure.

DETAILED DESCRIPTION

Figures 1, 3:
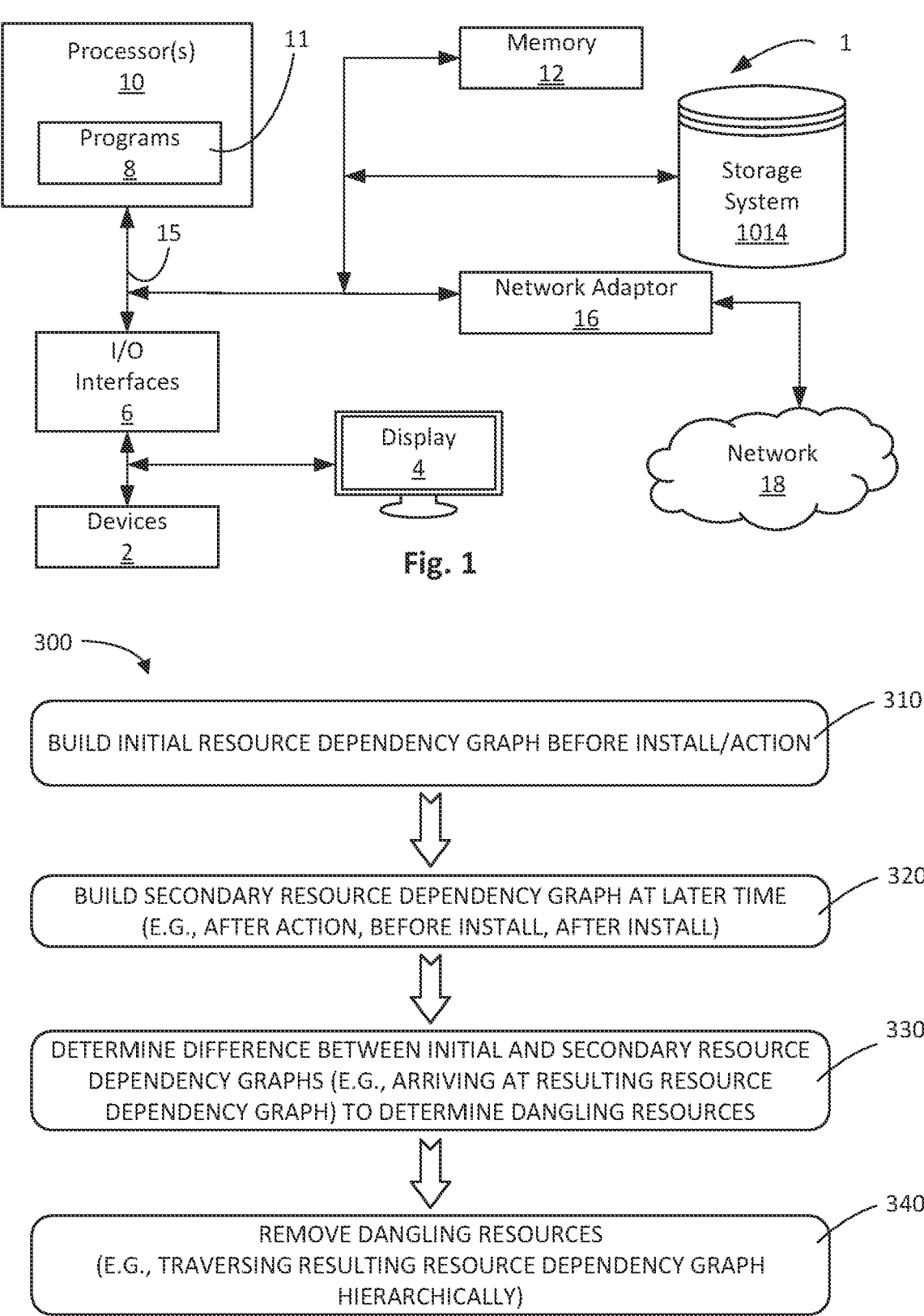
FIG. 1 is an overview block diagram of an exemplary computing environment on which the present disclosure of undoing an action and/or uninstalling software applications can be practiced according to an embodiment.
FIG. 3 is a flow chart showing a process for undoing an action and/or uninstalling a software application, according to an embodiment of the present disclosure.

The following description is made for illustrating the general principles of the invention and is not meant to limit the inventive concepts claimed herein. In the following detailed description, numerous details are set forth in one or more embodiments in order to provide an understanding of methods, techniques, computer program products, platforms, tools, and systems for undoing an action, including removing or uninstalling software applications from a computing environment in a more complete manner, including in an embodiment removing a cloud native software application preferably without leaving any dangling resources or remnants of the action and/or software application, however, it will be understood by those skilled in the art that different and numerous embodiments of the methods, techniques, computer program products, platforms, tools, and/or systems may be practiced without those specific details, and the claims and disclosure should not be limited to the arrangements, embodiments, features, aspects, systems, assemblies, subassemblies, structures, functional units, circuitry, programming, instructions, code, processes, methods, or details specifically described and shown herein. In addition, features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It should also be noted that, as used in the specification and the appended claims, the singular forms "a", "an" and "the" include plural referents unless otherwise specified, and that the terms "includes", "comprises", and/or "comprising," when used in this specification, specify the presence of stated features, integers, steps, operations, elements, and/or components, but do not preclude the presence or addition of one or more other features, integers, steps, operations, elements, components, and/or groups thereof.

It can be difficult to remove or uninstall software applications from a computing environment including uninstalling cloud native systems composed of many software applications and or services. For example, remnants, also referred to as drifts or dangling resources, can be left behind after the removal process is completed. In CPRWAIOps, for example, dedicated shell scripts are required for cleanup after a normal uninstall is completed to, for example, delete dangling resources such as Kubernetes Custom Resource (CR), Custom Resource Definition (CRD), Secret, Config Map, Persistent Volume Claim, Service Account, and other cluster level resources. Leaving remnants, drifts, or dangling resources after an uninstall process can effect computer performance. For example, the dangling resources can take up memory space, slow down processor speed and performance, decrease processor and memory efficiency.

There can be a number of reasons why resources (dangling resources, drifts, or remnants) remain after an action is undone or an application uninstall process is completed. In one situation a resource created by an owning resource remains after the uninstall process (becoming a dangling resource) because the owning resources as a result of a program bug forgets to delete the resource. In another situation, owning resources are deleted earlier than owned resources which leads to the owned resources remaining (becoming dangling resources) after the uninstall process is complete. For example, the modules which are responsible to delete or clean the resources are deleted too early so they are unavailable to delete, remove, or clean the remaining resources. In a Kubernetes cluster, for example, where workloads are installed by operators, very often resources remain because the responsible operator is deleted too early. In other situations, a shared resource referenced by other resources remain after the referencing resources are deleted. For example, resources are deleted without considering the hierarchy of the resources which can leave dangling resources.

It would be advantageous to undo an action and/or perform a software application uninstall procedure in a manner that provides a more complete or clean undo operation or uninstall procedure that preferably leaves no, or at least, less dangling resources or drifts. The present disclosure is directed to an improvement in computing technology and more specifically to a system, platform, tool, computer program product, method, and/or technique to more cleanly and completely undo and action and/or uninstall software applications in a computing environment to eliminate or at least decrease the dangling resources (drifts or remnants) of the action and/or software program that remain when the uninstall process is complete. The present disclosure has particular application in removing and/or uninstalling cloud native applications and programs, and in an approach undoing an action in a computing environment to bring the computing environment back to its original state from before the software application installation and/or performance of the certain action in the computing environment.

In one or more embodiments, the system, platform, tool, computer program product, method, and/or technique analyzes the software application relationships. In one or more embodiments, a scoped (initial) resource dependency graph is built for the target system before application installation begins, and a scoped (second) resource dependency graph is built for the target system before or after the application uninstall process completes. In a preferred embodiment, the scoped resource dependency graphs are built without user interruption or code modification. For example, a user does not have to explicitly specify resource dependencies by modifying resource manifest or code. The scoped (initial) resource dependency graph from before the install process begins and the scoped (second) resource dependency graph after the uninstall process is complete are used in one or more arrangements to detect drifts and dangling resources (e.g., the remnants of the application) that remain after the uninstall process. Preferably, the dangling resources are detected without user intervention. In another embodiment, the scoped (initial) resource dependency graph and the scoped (second) resource dependency graph from before the uninstall process is performed are used to detect resources added as a result of the software application installation process and to identify the resources that need to be deleted during the software application uninstall process.

In an embodiment, the differences between the (initial) resource dependency graph before application install and the (second) resource dependency graph after application uninstall are determined, for example by a comparison process, to uncover the dangling resources that remain, and in an embodiment form a resulting resource dependency graph. The dangling resources according to an embodiment are then deleted, preferably without user intervention specifying or providing additional directives to control the deletion order of the dangling resources. In an approach, the dangling resources are removed by traversing the hierarchal relationship of the resulting resource dependency graphs.

In one or more embodiments a resource dependency graph can be created before performing an action and after performing an action, and the two resource dependency graphs can be used to determine the dangling resources for supporting a general undo operation. For example, a comparison can be performed between the two resource dependency graphs to determine the dangling resources and the dangling resources that remain can thereafter be deleted. In a further embodiment, a resource dependency graph can be built before an install operation begins and before an application uninstall operation begins, and the difference between the two resource dependency graphs can be determined to support a complete, clean application uninstall process where any dependent resources (e.g., explicit and implicit dependent resources) are removed during the uninstall process. The result is a system, computer program product, platform, tool, and/or process that more completely removes dangling resources no longer needed by the computing environment and provides additional memory space, better memory efficiency and potentially greater performance of the computing environment.

As the disclosure is directed to an improvement in computing technology, the description will start with a discussion of one or more computing environments where the disclosure would be applicable. It should be appreciated that the disclosed computing environments are only examples, and that the disclosure is not limited to the specific computing environments disclosed. Furthermore, the following discussion omits or only briefly describes the computing environment, including the distributive computing environment, for example cloud computing environment, and removing or uninstalling software applications in and for use in a computing environment which are apparent to those skilled in the art. It is assumed that those skilled in the art are familiar with computing environments including distributive computing environments, for example cloud computing and that those of skill in the art are also familiar with software application removal processes and with machine learning (ML) models, cognitive analytics, and their application in accessing or analyzing data and relationship networks.

FIG. 1 illustrates an example computing environment 1 including for example a computing device and/or electronic data processing system 1 in which aspects of the present disclosure may be practiced. It is to be understood that the computing environment 1 depicted is only one example of a suitable computing and/or processing system and is not intended to suggest any limitation as to the scope of use or functionality of embodiments of the present invention. For example, the system shown may be operational with numerous other special-purpose computing system environments or configurations. Examples of well-known computing devices, systems, platforms, environments, and/or configurations that may be suitable for use in the present disclosure may include, but are not limited to, server computer systems, mainframe computers, distributed cloud computer systems, personal computer (PC) systems, PC networks, thin clients, thick clients, minicomputer systems, handheld or laptop devices, multiprocessor systems, microprocessor-based systems, smart phone, set top boxes, programmable consumer electronics, and the like that include any of the above systems or devices, and the like.

In some embodiments, the computing environment (e.g., computing device and/or system) 1 may be described in the general context of computer executable instructions, embodied as programs or program modules 8 (e.g., computer program product) stored in memory 12, being executed by the computer system. Generally, program modules may include routines, programs, objects, components, logic, data structures, and so on that perform particular tasks and/or implement particular input data and/or data types in accordance with the present invention.

The components of the computer environment 1 may include, but are not limited to, one or more processors or processing units 10, a memory 12, and a bus 15 that operably couples various system components, including memory 12 to processor 10. In some embodiments, the processor 10, which is also referred to as a central processing unit (CPU) or microprocessor, may execute one or more programs or modules 8 that are loaded from memory 12 to local memory 11, where the program module(s) embody software (program instructions) that cause the processor to perform one or more operations. In some embodiments, module 8 may be programmed into the integrated circuits of the processor 10, loaded from memory 12, storage device 14, network 18 and/or combinations thereof to local memory 11.

The processor (or CPU) 10 can include various functional units, registers, buffers, execution units, caches, memories, and other units formed by integrated circuitry, and may operate according to reduced instruction set computing ("RISC") techniques. The processor 10 processes data according to processor cycles, synchronized, in some aspects, to an internal clock (not shown). Bus 15 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer device and/or system 1 may include a variety of computer system readable media, including non-transitory readable media. Such media may be any available media that is accessible by the computer system, and it may include both volatile and non-volatile media, removable and non-removable media.

Memory 12 (sometimes referred to as system or main memory) can include computer readable media in the form of volatile memory, such as random-access memory (RAM), cache memory and/or other forms, including non-volatile memory. Computing environment 1 can further include other removable/non-removable, volatile/non-volatile computer system storage media. By way of example only, storage system 14 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 15 by one or more data media interfaces.

The computer environment 1 may also communicate with one or more external devices 2 such as a keyboard, track ball, mouse, microphone, speaker, a pointing device, etc.; one or more devices that enable a user to interact with the computer system; any devices (e.g., network card, modem, etc.) that enable the computer system to communicate with one or more other computing devices, and/or one or more displays 4 that present information to a user. Such communication can occur via Input/Output (I/O) interfaces 6. Communications or network adapter 16 interconnects bus 15 with an outside network 18 enabling the computing environment 1 to communicate with other such systems. Additionally, an operating system such as, for example, AIX ("AIX" is a trademark of the IBM Corporation) can be used to coordinate the functions of the various components shown in FIG. 1.

The computing environment 1 can communicate with one or more networks 18 such as a local area network (LAN), a general wide area network (WAN), and/or a public network (e.g., the Internet) via network adapter 16. As depicted, network adapter 16 communicates with the other components of computing environment via bus 15. It should be understood that although not shown, other hardware and/or software components could be used in conjunction with the computing environment. Examples include, but are not limited to: microcode, device drivers, redundant processing units, external disk-drive arrays, RAID systems, tape drives, and data archival storage systems, etc.

Figure 2:
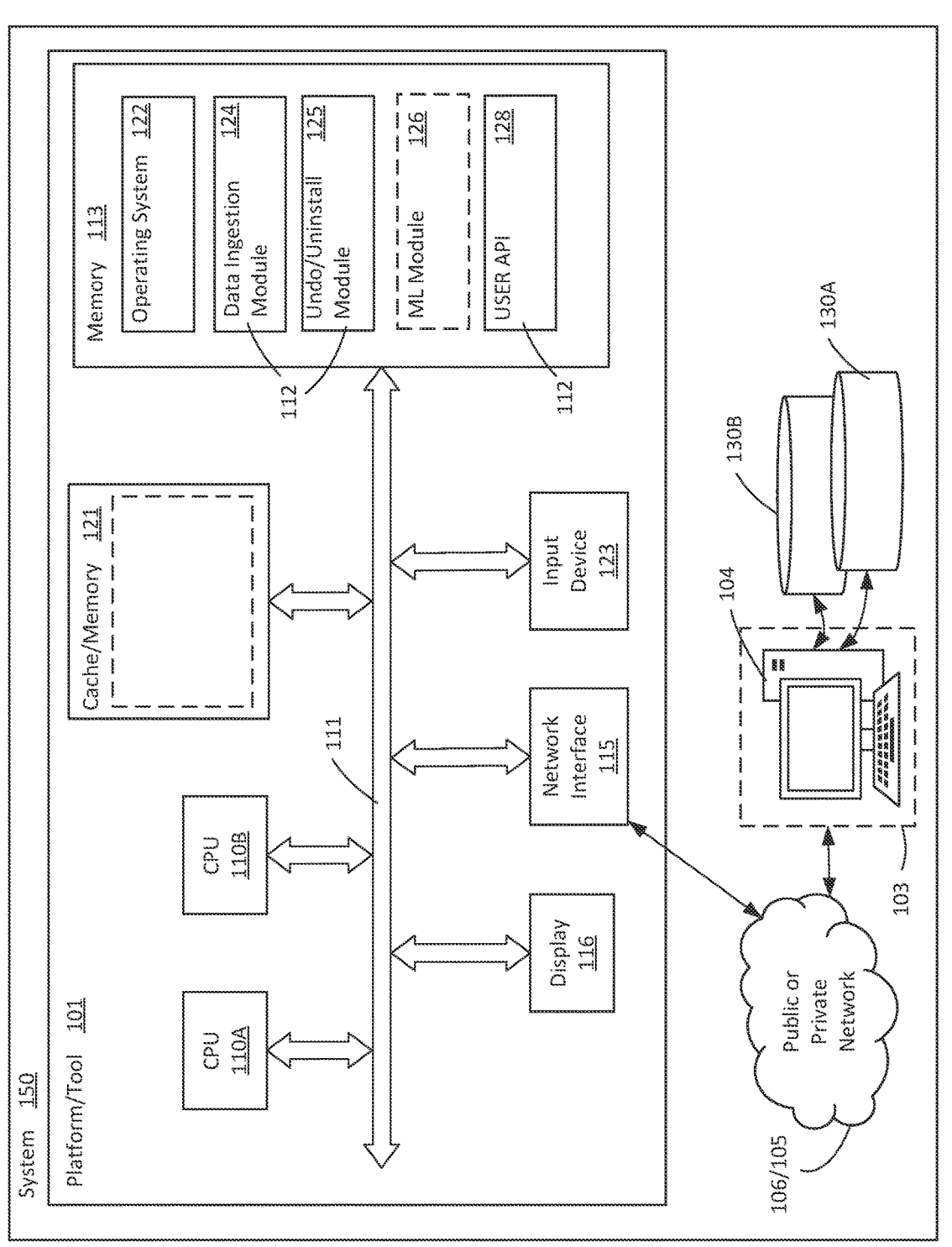
FIG. 2 is an overview block diagram of an exemplary computing environment to implement the present disclosure of undoing a computer operation, including uninstalling a software application, according to an embodiment of the present disclosure.

FIG. 2 illustrates a computing environment 150, including a platform, system, and/or tool 101, configured and programmed to perform a more complete and cleaner uninstall process or undo operation that includes according to an embodiment detecting, determining, and removing any dangling resources, drifts, or remnants remaining after or associated with a software application removal process and/or an action undo operation. According to an embodiment, platform/tool 101 can be referred to as a master node 101, and master node can be part of a computing environment, including a computing system 150, that includes one or more worker nodes or end user devices 103. In one or more aspects, platform and/or master node 101 can include, for example, mainframe computers, servers, distributed or cloud computing environments, thin clients, thick clients, personal computers, PC networks, laptops, tablets, mini-computers, multiprocessor-based systems, microprocessor-based systems, smart devices, smart phones, set-top boxes, programmable electronics, or any other similar computing device.

Platform and/or master node 101 can include a cloud-based server, and can include one or more hardware processors 110A, 110B (also referred to as central processing units (CPUs)), a memory 113, e.g., for storing an operating system, application program interfaces (APIs) and programs, a network interface 115, a display device 116, an input device 123, and any other features common to a computing device, including a server. Further, as part of platform 101, there is provided a local cache/memory 121 and/or an attached memory storage device (not shown).

In one or more aspects, platform 101 may, for example, be any computing environment or device, including one or more web-based or cloud-based computing devices that are configured to communicate over a public or private communications network 105/106 with one or more user devices 103 (e.g., worker nodes 103). For instance, client user devices 103 can communicate with platform 101 where client user devices can include processing resources and memory 104 that includes databases 130A and 130B.

In the embodiment depicted in FIG. 2 processors 110A, 110B may include, for example, a microcontroller, Field Programmable Gate Array (FPGA), or any other processor that is configurable to perform operations according to instructions in software programs as described below. These instructions may be stored, for example, as programmed modules in memory storage 113. Communication channels 111, e.g., wired connections such as data bus lines, address bus lines, Input/Output (I/O) data lines, video bus, expansion busses, etc., are shown for routing signals between the various components of Platform 101.

Network interface 115 is configured to transmit and receive data or information to and from platform 101, e.g., via wired or wireless connections. For example, network interface 115 may utilize wireless technologies and communication protocols such as Bluetooth®, WIFI (e.g., 802.11a/b/g/n), cellular networks (e.g., CDMA, GSM, M2M, and 3G/4G/4G LTE, 5G), near-field communications systems, satellite communications, via a local area network (LAN), via a wide area network (WAN), or any other form of communication that allows computing device 103 to transmit information to or receive information from platform 101.

Display 116 may include, for example, a computer monitor, television, smart television, a display screen integrated into a personal computing device such as, for example, laptops, smart phones, smart watches, virtual reality headsets, smart wearable devices, or any other mechanism for displaying information to a user. In one or more aspects, display 116 may include a liquid crystal display (LCD), an e-paper/e-ink display, an organic LED (OLED) display, or other similar display technologies. In one or more aspects, display 116 may be touch-sensitive and may also function as an input device. Input device 123 may include, for example, a keyboard, a mouse, a touch-sensitive display, a keypad, a microphone, a camera, or other similar input devices or any other input devices that may be used alone or together to provide a user with the capability to interact with the platform 101.

Memory 113 may include, for example, non-transitory computer readable media in the form of volatile memory, such as random-access memory (RAM), non-volatile memory, cache memory and/or other memory. Memory 113 may include, for example, other removable/non-removable, volatile/non-volatile storage media. By way of non-limiting examples only, memory 113 may include a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Memory 113 of platform 101 stores one or more modules that include, for example, programmed instructions adapted to more cleanly remove software applications and/or perform undo operations. In one embodiment, one of the programmed processing modules stored in memory 113 includes a data ingestion module 124 that provides instructions for employing logic and operating circuitry to access/read large amounts of data for use by other modules that process and/or analyze the electronic data.

In one or more embodiments, computing environment or system 150, including platform 101, e.g., memory 113, contains Undo/Uninstall Module 125, which contains modules for performing undo and/or uninstall operations as discussed in detail herein. It can be appreciated that portions of the Undo/Uninstall Module 125 can be distributed throughout platform 101. For example, the programs (e.g., software applications/instructions) for use by the Undo/Uninstall Module 125 can be stored outside Undo/Uninstall 125 and can be distributed throughout Platform 101 (e.g., Master Node 101) or in locations within computing environment/system 150. Similarly, the artificial intelligence (AI) utilized by the Undo/Uninstall Module 125 can reside within Undo/Uninstall Module 125, can be contained within a separate Machine Learning (ML) Module 126, or be distributed throughout the System 150 and/or Platform 101.

Platform 101 optionally includes a supervisory program having instructions to employ logic for configuring the processors 110, including the servers to call one or more, and in an embodiment all, of the program modules 112 and invoke the operations of system 150 and/or platform (master node) 101. In an embodiment, such supervisory program calls provide application program interfaces (APIs) for running the programs. At least one application program interface (API) 128 is invoked in an embodiment to undo an action, including perform an uninstall operation according to the one or more embodiments disclosed herein.

The computing environment, system, platform, tool, computer program product, method and/or techniques disclosed herein in one or more embodiments employ cognitive systems, programming and logic, also referred to as machine learning and/or artificial intelligence. As an overview, a cognitive system is a specialized computer system, or set of computer systems, configured with hardware and/or software logic (in combination with hardware logic upon which the software executes) to perform electronic data analytics and has the ability to emulate human cognitive functions. These cognitive systems apply, convey and manipulate electronic data at various levels of interpretation which, when combined with the inherent strengths of digital computing, can solve problems with high accuracy and resilience on a large scale. IBM Watson™ is an example of one such cognitive system which can process human readable language and identify inferences between text passages with human-like accuracy at speeds far faster than human beings and on a much larger scale. In general, such cognitive systems are able to perform the following functions:

Navigate the complexities of human language and understanding

Ingest and process vast amounts of structured and unstructured electronic data

Generate and evaluate hypotheses

Weigh and evaluate responses that are based only on relevant evidence

Provide situation-specific advice, insights, and guidance

Improve knowledge and learn with each iteration and interaction through machine learning (ML) models and processes Enable decision making at the point of impact (contextual guidance)

Scale in proportion to the task

Extend and magnify human expertise and cognition

Identify resonating, human-like attributes and traits from natural language

Deduce various language specific or agnostic attributes from natural language

Provide a high degree of relevant recollection (memorization and recall) from data points (images, text, voice)

Predict and sense with situation awareness that mimics human cognition based on experiences Answer questions based on natural language and specific evidence.

FIG. 3 outlines an exemplary flowchart in accordance with an embodiment illustrating and describing an overview method 300 of performing an undo and/or uninstall process to undo certain actions and/or remove software applications, including removing cloud native applications. While the method 300 is described for the sake of convenience and not with an intent of limiting the disclosure as comprising a series and/or a number of steps, it is to be understood that the process 300 does not need to be performed as a series of steps and/or the steps do not need to be performed in the order shown and described with respect to FIG. 3 but the process 300 can be integrated and/or one or more steps can be performed together, simultaneously, or the steps can be performed in the order disclosed or in an alternative order.

According to one or more approaches of undoing an action and/or performing an uninstall process to more completely remove a software application, preferably completely remove a software application, for example a cloud native application, from a computing environment, for example so that no dangling resources remain, or at least fewer dangling resources remain, method 300 includes at 310 building or forming an initial or first resource dependency graph before or at the time of installing the software application and/or performing a certain or targeted action. It can be appreciated that in one or more embodiments, building the initial resource dependency graph at 310 can be triggered by a user or by a program, including the program for performing the undo operation and/or uninstall operation, for example as provided in undo/uninstall module 125. Method 300 in an embodiment further includes at 320 building or forming a second or later resource dependency graph at a later time, for example after performing a certain action, before the uninstall process begins, and/or after the uninstall process is performed. It can be appreciated that in one or more embodiments, building the second or later resource dependency graph at 320 can be triggered by a user or by a program, including the program for performing the undo operation and/or uninstall operation.

The resource dependency graph shows the resources associated with an action and/or software application and in an approach shows the resources owned, controlled, and/or used by the subject or target action and/or software application/program. The resource dependency graph according to an approach includes resources that the action and/or software application are explicitly dependent upon (e.g., resources owned by the action and/or software application)

as well as implicit resources that the action and/or software application are implicitly dependent upon (e.g., associated resources). In other words, the resource dependency graph identifies and includes all resources that a target action and/or target software application depends upon or uses to operate. In a preferred embodiment, the resource dependency graph identifies which resources are owned by owning resources. In other words, the resource dependency graph identifies the hierarchical relationship of the resources of the target action and/or software application.

Figure 4:
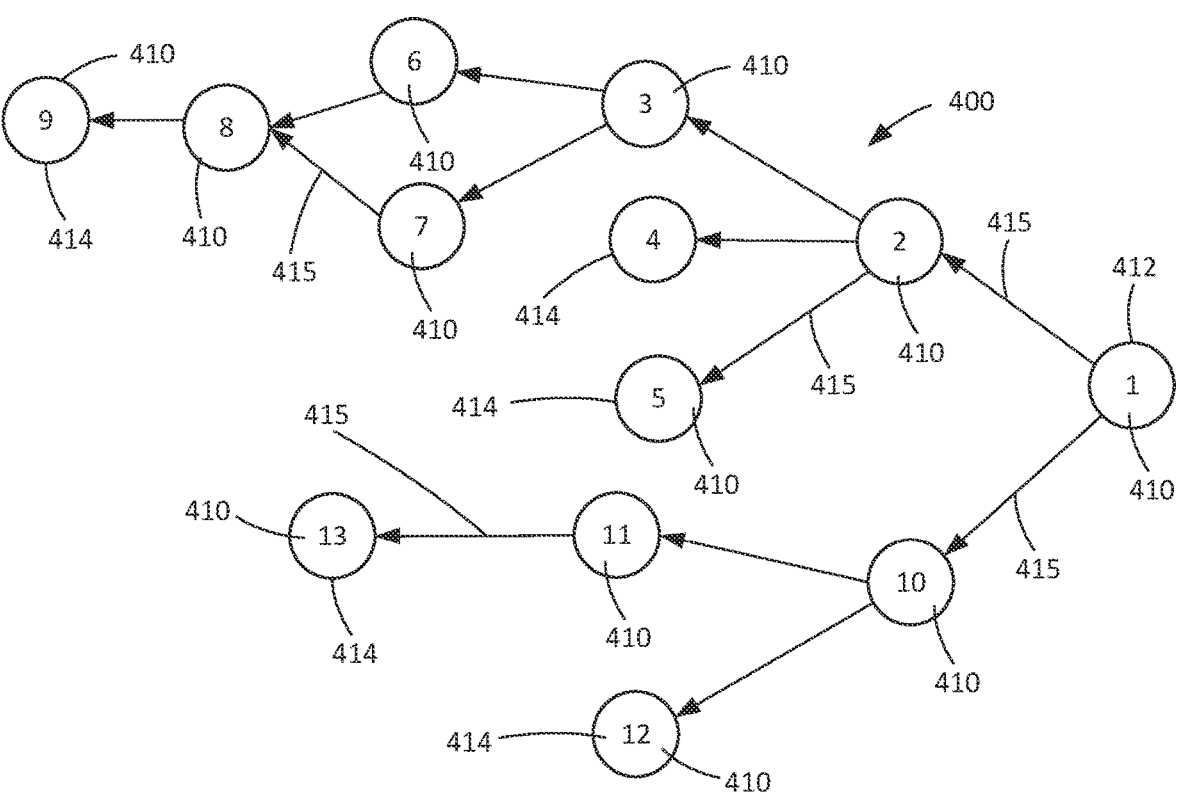
FIG. 4 is an example diagrammatic representation of a resource dependency graph comprising a plurality of resource nodes where the resource nodes represent one or more computing resources, according to an embodiment of the present disclosure.

The resource dependency graph in an embodiment is arranged as a hierarchical tree structure, with interconnected nodes, and typically includes a root node and one or more inner (branch) nodes and external (e.g., leaf) nodes. Another manner of considering the hierarchical tree structure of the resource dependency graph is by considering ownership nodes and subordinate nodes where subordinate nodes would be child nodes and ownership nodes would be parent nodes. For example, dependent (e.g., owned) resources would be subordinate resources whereas owner or owner-ship resources/nodes would be parent nodes. A diagrammatic representation of a resource dependency graph is shown in FIG. 4. FIG. 4 shows resource dependency graph 400 having thirteen nodes 410 where node 412 is root node "1" or the root level resource, and leaf nodes 414 are nodes "4", "5", "9", "12", and "13". The arrows or links 415 show relationships between the nodes 410 including what resource node owns which one or more nodes 410, where the head of the arrow points to the owned resource/node. Accordingly, as shown in FIG. 4, root node "1" (412) depends upon nodes "2" and "10"; node "2" depends upon nodes "3", "4" and "5"; etc. Another manner of interpreting resource dependency graph 400 is that the resources represented by nodes "2" and "10" depend upon root node "1" (412) or node "1" owns nodes "2" and "10".

Process 300 then uses the initial resource dependency graph and the second resource dependency graph to determine the dangling resources or drifts. More specifically, at 330, the difference between the initial resource dependency graph and the second resource dependency graph is determined and the resulting difference identifies the dangling resources. In one or more embodiments, a comparison is made between the initial resource dependency graph and the second resource dependency graph to determine the difference and identify the dangling resources. In other words, at 330 a difference between the two graphs built in steps 310 and 320 is ascertained, with the result identifying the dangling resources or drifts. In one or more embodiments, the remaining resources or drifts are used and form a resource dependency graph, also referred to as the resulting resource dependency graph. The resulting resource dependency graph is the differential or difference between the initial resource dependency graph and the second resource dependency graphs, and in an embodiment identifies the relationship between the drifts and remaining resources, including in an approach the hierarchical relationship of the drifts and remaining resource (e.g., dangling resources).

Process 300 continues to 340 where the dangling resources are removed or deleted. In one or more embodiments the dangling resources are identified and removed by traversing the resulting resource dependency graph obtained by performing the comparison between the initial and second resource dependency graph (e.g., determining the difference between the two resource dependency graphs). In an approach, the resulting resource dependency graph is traversed hierarchically by removing leaf (dependent or subordinate) nodes before parent nodes. That is, resources that are dependent upon other resources are removed and/or deleted before the owning resources.

Figure 5:
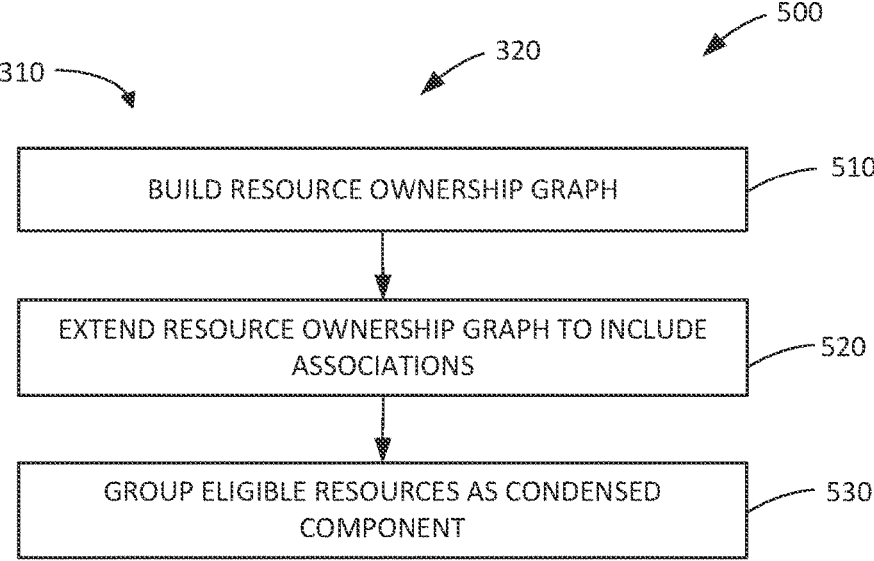
FIG. 5 is a flow chart of a method to build a resource dependency graph, according to an embodiment of the present disclosure.

While FIG. 3 illustrates overview process 300 of undoing an action and/or uninstalling a software application, one or more embodiments of performing the subprocesses 310, 320, 330 and 340 of process 300 will be described with reference to FIGS. 5-16. More specifically FIG. 5 illustrates a process 500 of building the initial resource dependency graph of subprocess 310 and the second resource dependency graph of subprocess 320. FIG. 5 outlines an exemplary flowchart in accordance with an embodiment illustrating and describing an overview method 500 of building a resource dependency graph, which in an approach can be used in subprocesses 310 and 320. While the method 500 is described for the sake of convenience and not with an intent of limiting the disclosure as comprising a series and/or a number of steps, it is to be understood that the process 500 does not need to be performed as a series of steps and/or the steps do not need to be performed in the order shown and described with respect to FIG. 5 but the process 500 can be integrated and/or one or more steps can be performed together, simultaneously, or the steps can be performed in the order disclosed or in an alternative order.

According to an approach, process 500 includes at 510 building a resource ownership graph, where for example a resource ownership graph identifies resources owned (e.g., explicitly) by other resources of the targeted action and/or targeted software program. In an example approach, ownership means one resource is fully responsible for the lifecycle of another resource, e.g., creates and deletes the resource. FIG. 6 illustrates examples of ownership dependency. For example, in FIG. 6, the Deployment resource 605 owns the Replica Set resource 610 which in turn owns Pod resource 615. In similar fashion, Operator resource 620 owns Custom resource 625.

At 520 the resource ownership graph is extended to include associations to the targeted action and/or targeted software program. That is, at 520, according to an embodiment, the resource ownership graph is expanded to include resources that are associated with or to (e.g., used by, defined by, or consumed by) resources owned by the targeted action and/or the targeted software application (e.g., expanded to include implicit dependencies). In an example approach, association means one resource consumes another resource while it may or may not be responsible for its lifecycle, e.g., a pod uses a secret, a custom resource is defined by a custom resource definition. FIG. 7 shows examples of association dependency. For example, FIG. 7 illustrates Pod 705 suing Secret 710 and Custom resource 715 defined by Custom Resource Definition 720. Association dependency can be defined either explicitly, like ownerReference, or implicitly. Both can help build the resource dependency graph by enriching the semantic relationship between nodes along with ownership dependency.

At 530, process 500 includes condensing group eligible resources into condensed components. An example process of condensing eligible resources into condensed components will be described by reference to process 1100 in FIG. 11.

FIG. 8 is an exemplary flowchart in accordance with an embodiment illustrating and describing a method 800 of building a resource ownership graph, which in an approach can be used in subprocess 510. While the method 800 is described for the sake of convenience and not with an intent of limiting the disclosure as comprising a series and/or a number of steps, it is to be understood that the process 800 does not need to be performed as a series of steps and/or the steps do not need to be performed in the order shown and described with respect to FIG. 8 but the process 800 can be integrated and/or one or more steps can be performed together, simultaneously, or the steps can be performed in the order disclosed or in an alternative order.

Method, process, or subprocess 800 at 810 includes scanning the target system for resource manifests stored in a resource datastore. In an example, the target system is scanned for resource manifests stored in Kubernetes resource datastore (i.e., etcd datastore). Ownership dependency between two resources is defined in Kubernetes by ownerReference. At 820, method 800 continues by determining existing definitions that represent explicit relationship between resources. In an example, existing ownerReference definitions among the resources are determined for explicit dependencies. At 830 resource explicit dependencies are parsed. In one or more approaches, start at one resource, parse its definition to find out its explicit relationship (e.g., the ownerReferences), then advance to other resources (e.g., via ownerReferences) and do the same action for these other resources. This process reoccurs reiteratively until no more resources are found. In an embodiment, resource manifests are parsed as structured data for explicit dependencies. At 840 the ownership resource graph is built, preferably iteratively, e.g., resource node by resource node. The result according to an embodiment is a resource dependency graph with all nodes referenced with each other via the ownerReferences.

Figure 9:
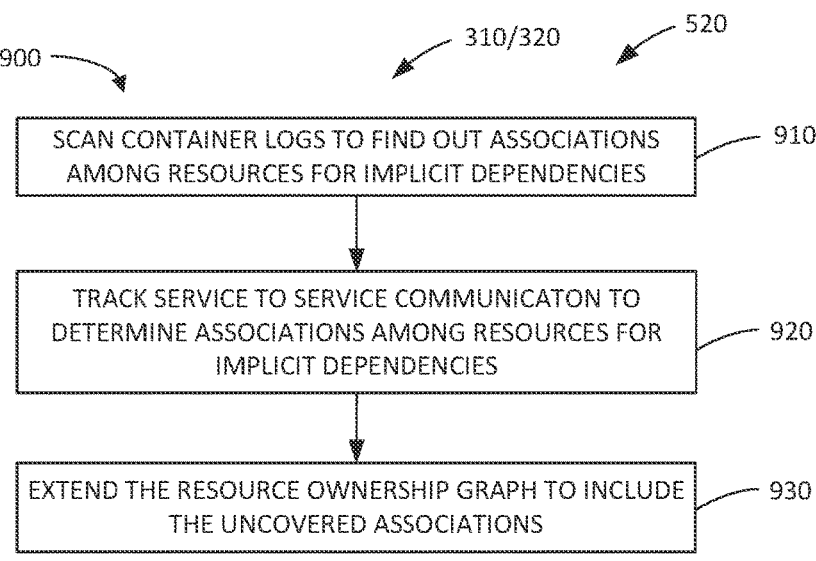
FIG. 9 shows a flow chart of a process for extending the ownership resource dependency graph to include associations to arrive at the resource dependency graph, according to an embodiment of the present disclosure.

FIG. 9 is an exemplary flowchart in accordance with an embodiment illustrating and describing a method 900 of extending the resource ownership graph to include associations, which in an approach can be used in subprocess 520. Extending the resource ownership graph to include associations identifies additional resources that might not otherwise be captured or identified by looking only at ownership relationships. While the method 900 is described for the sake of convenience and not with an intent of limiting the disclosure as comprising a series and/or a number of steps, it is to be understood that the process 900 does not need to be performed as a series of steps and/or the steps do not need to be performed in the order shown and described with respect to FIG. 9 but the process 900 can be integrated and/or one or more steps can be performed together, simultaneously, or the steps can be performed in the order disclosed or in an alternative order.

Method, process, or subprocess 900 includes at 910 scanning container logs to find out associations among resources for implicit dependencies, and at 920 tracking service to service communications to find out and determine associations among resources for implicit dependencies. In an embodiment, determine static Kubernetes relationships, for example, by leveraging and using existing Kubernetes ownerReference definitions. Further, in an embodiment, determine dynamic Kubernetes relationships, for example, by analyzing API calls received by the Kubernetes API Server (See FIG. 17A) between different components, e.g., a pod calls API to write ConfigMap. In one or more embodiments, workload logs, API calls, and/or network traffic is reviewed and analyzed as structured and/or unstructured data for implicit dependencies using, for example, Natural Language Processing (NPL), Deep Learning (DL), Machine Learning (ML) and many other Artificial Intelligence (AI) techniques. At 930, the resource ownership graph is extended and expanded to include the uncovered associations (e.g., the implicit dependencies) at 910 and 920 to create the resource dependency graph.

Building the resource dependency graph includes in an approach determining the application relationship for cloud native components. For example, application-level relationships can be determined with trace analyses based on OpenTelemetry data automatically generated by different cloud native components. Building the resource dependency graph also includes determining the application relationship for all components including traditional components. In an embodiment, sidecar related applications, for example Kubernetes Istio or Openshift Service Mesh, can identify interactions between different components.

Figure 10:
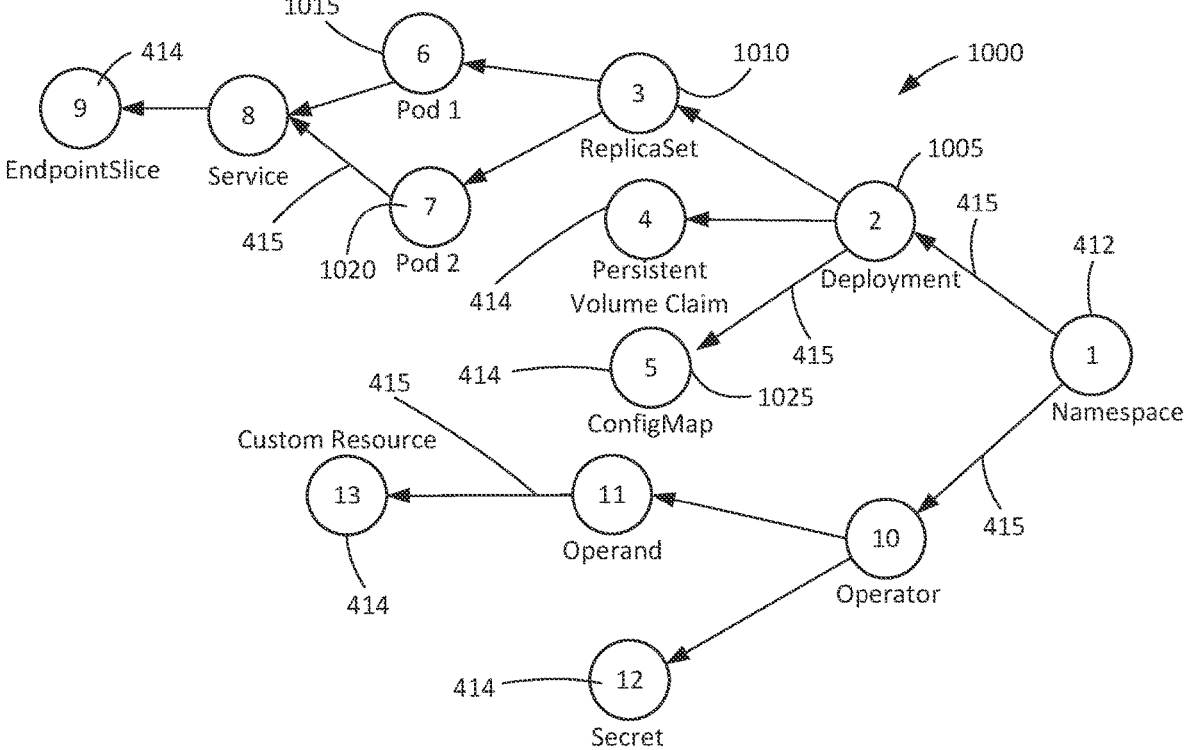
FIG. 10 shows an example diagrammatic representation of a limited resource dependency graph (e.g., a namespace resource dependency graph) comprising a plurality of resource nodes, according to an embodiment of the present disclosure.

In building the resource dependency graph it may be advantageous to limit the scope of the resource dependency graph within a set of resources rather than scan the whole cluster. That is, it might be advantageous to narrow down the scope for the pipelines (See FIG. 17B) when they start to collect and parse the data for building or forming the resource dependency graph. For example, if only resources in a specific namespace are of concern and/or relevant, then no purpose is served by having the pipelines scan all resources across the whole cluster which is usually very time consuming. Instead, in an embodiment, only the resources within the particular namespace are scanned, which leads to more efficient operations in identifying resources dependent upon the action being undone and/or the application being removed. Limiting the scope or the scanning of resources can be implemented by using labels and sectors or specifying a namespace. FIG. 10 provides an example resource dependency graph 1000 resulting from building a resource ownership graph according to the embodiment of process 800 and extending the resource ownership graph to include resource associations (implicit dependencies) according to process 900. In FIG. 10, the example resource dependency graph 1000 is limited to a Namespace, e.g., Namespace Resource Dependency Graph.

In some instances, there are nodes in the resource dependency graph that can be treated as grouped nodes, e.g., nodes that can be condensed and grouped together. An example of a node that can be condensed and grouped would be nodes that have high dependencies with each other, for example child nodes that can only be deleted from the parent node. In one or more approaches where nodes have high dependency, the child nodes can be deleted from the parent node and Kubernetes will handle the rest of the deletion. In one or more embodiments external dependencies would be detected from either the parent node or the child nodes. For example, in FIG. 10, Deployment node "2" 1005→ReplicaSet node 1010→Pod Group 1015, 1020 dependencies can be detected from transaction call dependencies from pod side-car, and Secret/ConfigMap node "5" 1025 dependency can be detected by parsing deployment definition.

Figure 11:
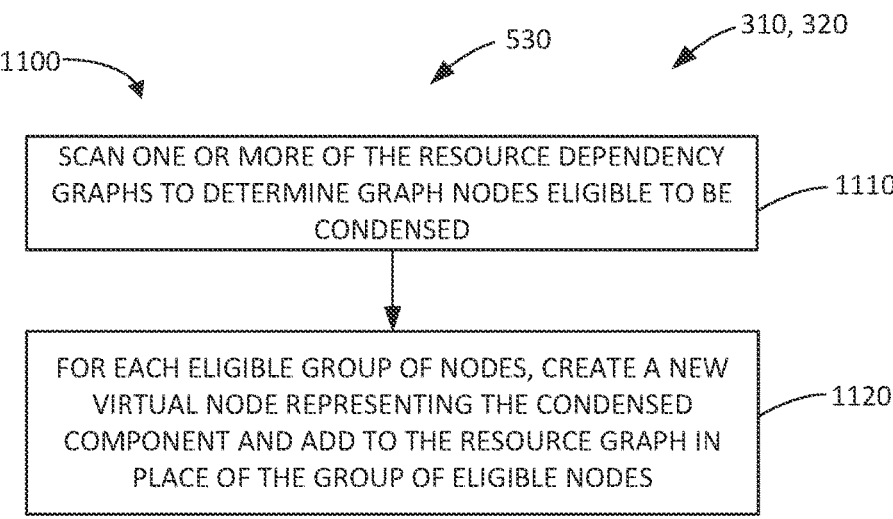
FIG. 11 shows a flow chart of a process for condensing resource nodes in a resource dependency graph, according to an embodiment of the present disclosure.

FIG. 11 is an exemplary flowchart in accordance with an embodiment illustrating and describing a method 1100 of condensing nodes in the resource dependency graph, e.g., a resource ownership graph extended to include associations (implicit dependencies), which in an approach can be used in subprocess 530. While the method 1100 is described for the sake of convenience and not with an intent of limiting the disclosure as comprising a series and/or a number of steps, it is to be understood that the process 1100 does not need to be performed as a series of steps and/or the steps do not need to be performed in the order shown and described with respect to FIG. 11 but the process 1100 can be integrated and/or one or more steps can be performed together, simultaneously, or the steps can be performed in the order disclosed or in an alternative order.

Figure 12:
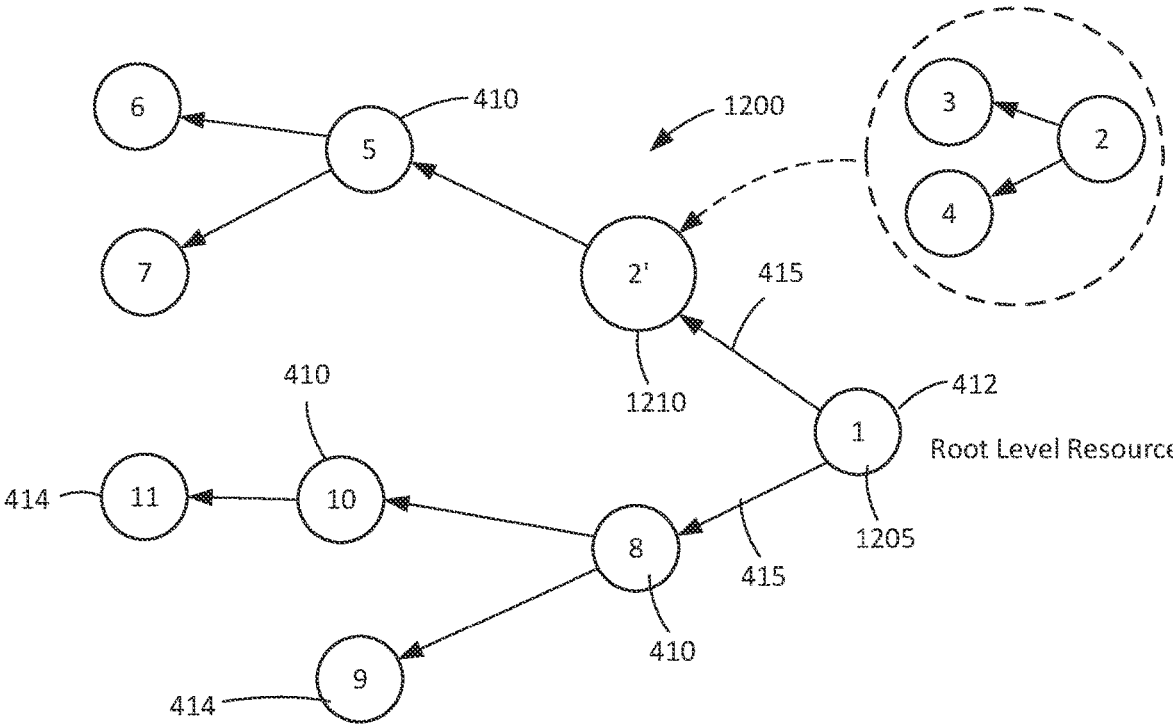
FIG. 12 shows an example diagrammatic representation of a resource dependency graph having a condensed node, according to an embodiment of the present disclosure.

Process 1100, which in an embodiment can be process 530 used in process 500 and part of processes 310 and/or 320 in process 300, includes at 1105 scanning resources to determine which, if any, graph nodes 410 are eligible to be condensed. At 1110, for one or more, or for each group of, nodes eligible for condensing, a new virtual node is created representing the condensed node and added to (e.g., substituted in) the resource dependency graph in place of the group of nodes that the virtual node represents. FIG. 12 represents an illustration of a group of nodes being condensed in the resource dependency graph represented as a virtual node 1210. FIG. 12 is a resource dependency graph having a condensed or virtual node, where node 1 412 is a root level resource, while virtual node 2' 1210 represents nodes 2, 3, and 4. In one or more embodiments, at 1110 components to be condensed are based on a pattern database (See Pattern DB 1732 in FIG. 17B), e.g., Deployment/ReplicaSet, Pod; DaemonSet/Pod/ControllerRevision; StatefulSet/Pod/ControllerRevision; Service/EndpointSlice; etc.

In an example embodiment, node formatting before merging and/or condensing into condensed or virtual nodes can be represented as:

[{id:'xxx', type:'deployment', volumnrefs:[ . . . ], servicesrefs:[ . . . ], . . . },{id:'yyy', type:'replicaset', . . . } {id:zzz', type:'pod', . . . , discoveredtrafficRefs:[ . . . ]}], while node formatting after merging and/or condensing into condensed or virtual nodes can be represented as:

[{id:'xxx-yyy-zzz', type:'dep-rep-pod', volumnrefs:[ . . . ], servicesrefs:[ . . . ], discoveredtrafficRefs:[ . . . ], . . . , originNodes:

[{id:'xxx', . . . },{id:'yyy', . . . },{id:'zzz', . . . }]}].

In one or more embodiments, after the initial resource dependency graph is built and the second resource dependency graph is built, for example after an action (e.g., after an undo action) is performed, before an uninstall of a software application, or after an uninstall application of a software application, the difference between the two resource dependency graphs is determined to identify the drifts or dangling resources. The initial resource dependency graph captured before an action is performed and/or before installation of a software application begins in a target system (e.g., computing environment) is persisted and treated as a desired state, which is treated as the single source of truth. The resource dependency graph captured after performance of the undo action or after the uninstall operation ends is treated as the actual state. Detecting resource drifts in an embodiment is performed as a post step after performance of the undo action operation or after the uninstall process is finished. The detection according to an approach is a differential operation performed between the two resource dependency graphs so that graph comparison algorithms can be applied. The resources remaining after the differential operation and/or comparison between the two resource dependency graphs will be identified or marked as dangling resources. The differential results between the two resource dependency graphs may not always be a set of discrete resources (nodes), and can be a resource dependency graph (e.g., a resulting resource dependency graph) as well as nodes in a resource dependency graph (e.g., resulting resource dependency graph) that may have dependencies upon each other.

FIG. 13 is an exemplary flowchart in accordance with an embodiment illustrating and describing a method 1300 of determining the difference between two resource dependency graphs to identify dangling resources or drift, which in an approach can be used in subprocess 330. Other methods beyond method 1300 can be used to determine dangling resources and/or drifts and/or form resulting resource dependency graph. While the method 1300 is described for the sake of convenience and not with an intent of limiting the disclosure as comprising a series and/or a number of steps, it is to be understood that the process 1300 does not need to be performed as a series of steps and/or the steps do not need to be performed in the order shown and described with respect to FIG. 13 but the process 1300 can be integrated and/or one or more steps can be performed together, simultaneously, or the steps can be performed in the order disclosed or in an alternative order.

Figures 15, 16:
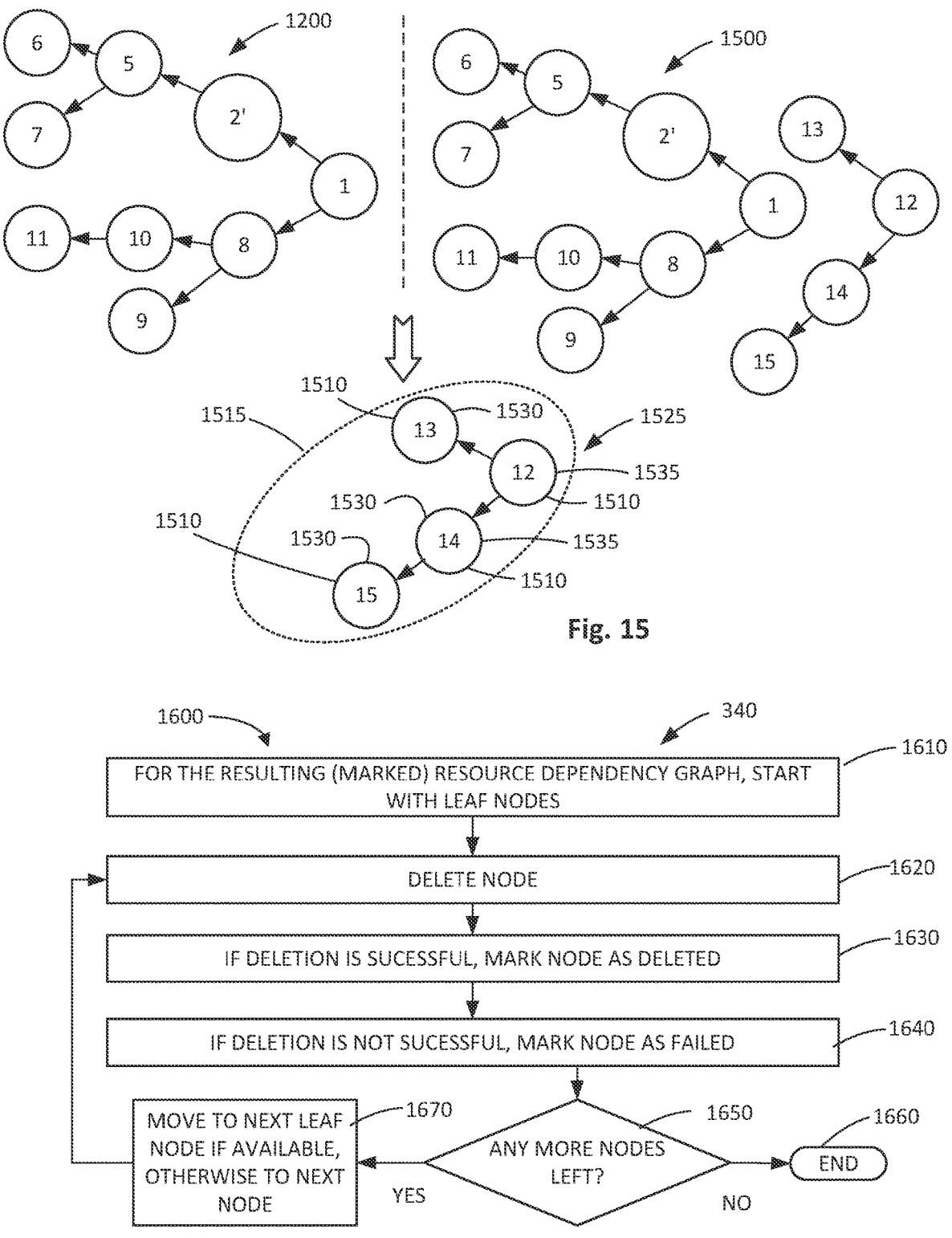
FIG. 15 is a diagrammatic representation of the process of creating a resulting (marked) resource dependency graph, according to embodiment of the disclosure.
FIG. 16 is a flow chart of a method of deleting dangling resources in a resulting (marked) resource dependency graph, according to an embodiment of the disclosure.

At 1310, for each node in the initial resource graph, determine if the second resource dependency graph contains the same node. If the node is located in both resource dependency graphs, at 1320 mark the node as visited. If the node can only be located in the initial resource dependency graph, at 1330 mark the node as ignored (e.g., because the node has been removed), and if the node can only be located in the second resource dependency graph, mark the node as dangling. FIG. 14 illustrates the process 1300, where a comparison or differential operation is performed between the initial resource dependency graph 1200 and second resource dependency graph 1400, and the comparison and/or difference between the two resource dependency graphs results in resulting (marked) resource dependency graph 1425 (e.g., nodes 1410) which are drifts each marked as dangling resources 1415. FIG. 15 illustrates the process 1300, where a comparison or differential operation is performed between the initial resource dependency graph 1200 and the second resource dependency graph 1500, and the resulting the comparison and/or differentiation between the two resource dependency graphs results in resulting (marked) resource dependency graph 1525 having nodes 1510, which are drifts marked as dangling resources 1515.

FIG. 16 is an exemplary flowchart in accordance with an embodiment illustrating and describing a method 1600 of removing and/or deleting resource drifts and/or dangling resources (e.g., from a resulting resource dependency graph), which in an approach can be used in subprocess 340. Other methods beyond method 1600 can be used to remove and/or delete dangling resources and/or drifts. While the method 1600 is described for the sake of convenience and not with an intent of limiting the disclosure as comprising a series and/or a number of steps, it is to be understood that the process 1600 does not need to be performed as a series of steps and/or the steps do not need to be performed in the order shown and described with respect to FIG. 16 but the process 1600 can be integrated and/or one or more steps can be performed together, simultaneously, or the steps can be performed in the order disclosed or in an alternative order.

Process 1600 starts at 1610 with the leaf nodes 415 (e.g., subordinate or owned nodes) in the resulting marked resource dependency graph (e.g., graphs 1425, 1525) where the subject or target node (e.g., the first leaf node) is deleted at 720, and at 730 if the node deletion is successful, the node successfully deleted is marked as deleted and if the node deletion is not successful the node is marked as failed. In an embodiment, if node deletion fails, the failure will be reported to user, preferably with details, so a manual rescue (e.g., manual deletion) can be performed. Advantageously, where the failure is reported to the user, the user knows which resources remain and should be deleted manually.

Process 1600 continues to 1650 where it is determined whether there are any further nodes left in the resulting (marked) resource dependency graph, and if at 1650 it is determined that no more nodes are left in the resulting (marked) resource dependency graph (1650: No), than at 1660 process 1600 terminates or ends. If it is determined that there are additional nodes remaining in the resulting (marked) resource dependency graph (1650: Yes), then process 1600 continues to 1670 where process 1600 moves to the next leaf (subordinate or owned) node, if available, or otherwise moves to a parent node (a non-leaf, parent, or ownership node). After 1670, process 1600 moves to 1620 where the subject or target node (leaf or parent node) is deleted. Process 1600 continues until it is determined that no more nodes are left in the resulting (marked) resource dependency graph and process 1600 continues to 1660 and ends.

It can be appreciated that the differential results between the initial resource dependency graph and the second resource dependency graph, e.g., the resulting (marked) resource dependency graph 1425, 1525, may not always be a set of discrete resources (e.g., leaf/child nodes 1410) as shown in FIG. 14, but can result in an example resulting (marked) resource dependency graph 1525 shown in FIG. 15 where nodes 1530 in the resulting marked resource dependency graph 1525 have dependencies with (e.g., are owned by or subordinate to) other nodes 1535. As shown in FIG. 15, node "13" is a child node 1530 dependent upon node "12" (e.g., parent node 1535), while node "15" is a leaf or child node 1530 dependent upon node "14", (e.g., parent node 1535). Node "14" is a child node 1530 dependent upon root node "12" (e.g., parent node 1535). That is, a child node 1530 can also be a parent node 1535 in the resulting (marked) resource dependency graph.

When deleting dangling resources, the graph traversing algorithm starts and proceeds with dangling resources that depend upon (e.g., are owned by or subordinate to) other resources, e.g., starts with leaf or dependent nodes and proceeds to parent or ownership nodes. For example, deleting an operator and its operands starts with and proceeds in the direction of deleting custom resources, then the operands, and then the operator. Referring to the resulting (marked) resource dependency graph 1525, leaf node 13 or 15 would be deleted first, followed by the other of leaf nodes 13 or 15, followed by node 14 and lastly node 12 would be deleted. That is, the dangling resources are deleted according to their hierarchy where dependent resources (e.g., child or leaf nodes) are deleted before the parent resources.

It is worth repeating that the process of deleting resource nodes or drifts can occur as a post step after the typical software application uninstall process is finished to catch any undeleted resources or drifts, or the deleting resource nodes or drifts can be performed as part of the uninstalling software application(s) process.

As indicated above, a process of performing a generic undo operation is described where the initial resource dependency graph is captured for the desired state any time before a certain (e.g., the target or subject) action begins or is undertaken and the second resource dependency graph of the actual state is captured after the certain (e.g., subject or targeted) action is finished, and the difference between the two resource dependency graphs is ascertained to determine all the resources introduced by the certain subject or targeted action. The differential results between the two graphs, e.g., the resulting (marked) resource dependency graph, are deleted by traversing the resulting (marked) resource dependency graph hierarchically, which will delete all resources introduced by the certain (subject, target) action. In this manner, an arbitrary or certain action performed on a target system can be undone.

A manner of performing a more complete software uninstall operation, particularly for cloud native application, is also disclosed. In one or more approaches, the initial resource dependency graph for the desired state is captured any time before the software application is installed. In an embodiment an uninstall process is performed to remove the software application and in an approach, the second resource dependency graph of the actual state is performed after the software uninstall. A differential operation (e.g., a comparison) between the initial resource dependency graph and the second resource dependency graph is performed to develop or build the resulting (marked) resource dependency graph (e.g., ascertain or determine whether any dangling resources remain after the software uninstall process) is performed. The differential results between the two resource dependency graphs, e.g., the dangling resources represented as nodes in resulting (marked) resource dependency graph, are deleted by traversing the resulting (marked) resource dependency graph hierarchically, which will delete all resources (dangling resources) introduced by the install process and revert the system back to the status before the software application install process took place.

In a similar manner, the initial resource dependency graph for the desired state can be captured before installation of a software application and resource drift detection can be performed as a pre-step before the uninstall operation begins, which according to an approach includes determining the second resource dependency graph before the software uninstall operation. A differential operation (e.g., a comparison) between the initial resource dependency graph and the second resource dependency graph is undertaken to ascertain or determine all the resources introduced since the software install process. The differential results between the two resource dependency graphs, e.g., the resulting (marked) resource dependency graph, are deleted by traversing the resulting (marked) resource dependency graph hierarchically, which will delete all resources introduced by the install process and revert the system back to the status before the software application install process took place.

Figures 17A, 17B:
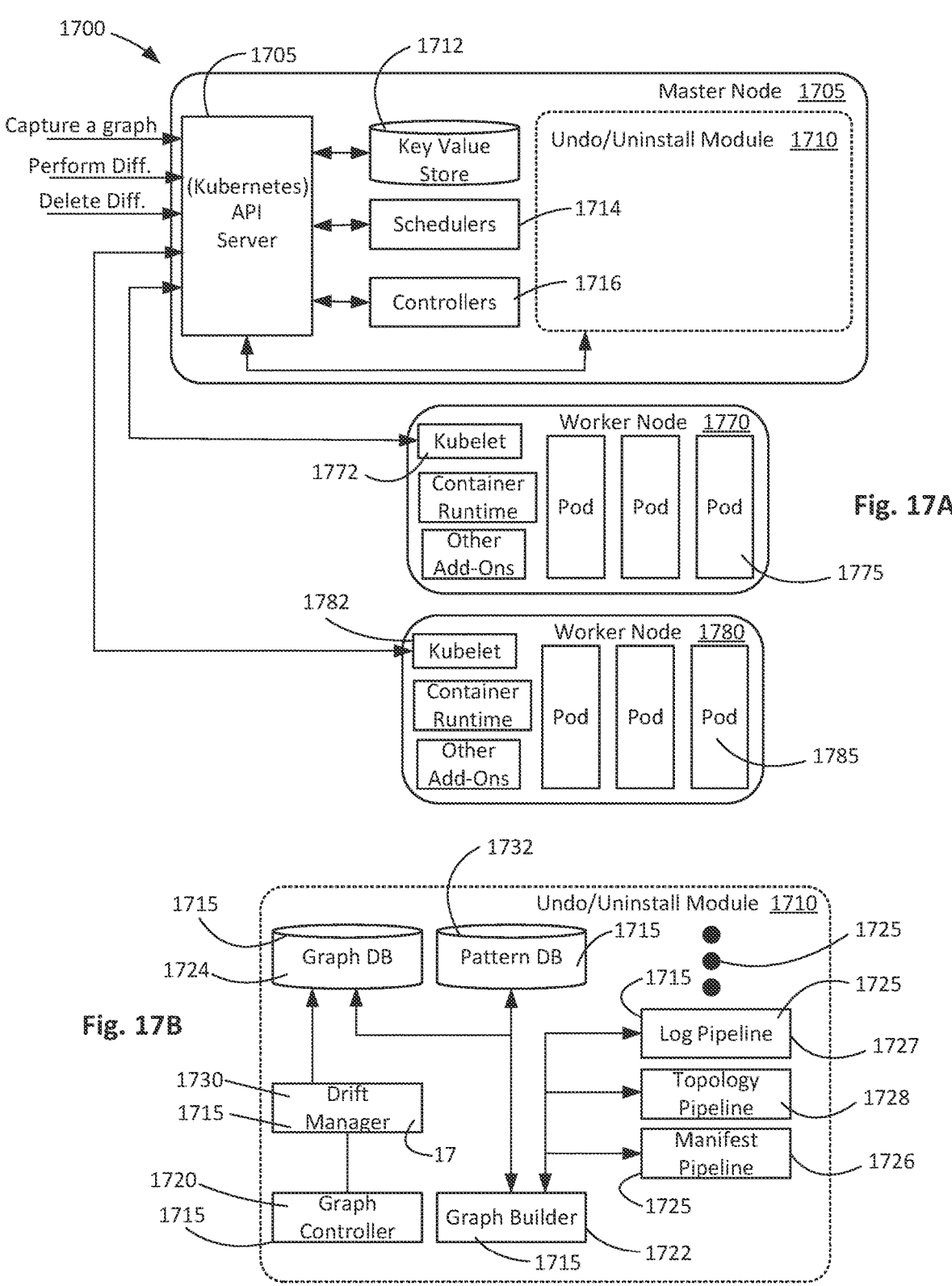
FIG. 17A is a representative block diagram of a computing system including a master node containing an undo/uninstall module for undoing an action and/or uninstalling a software application, according to an embodiment of the disclosure.
FIG. 17B is a representative block diagram of an undo/uninstall module for use in a computing environment to perform an undo operation and/or remove a software application from a computing environment, according to an embodiment of the disclosure.

FIG. 17A illustrates a computing environment, platform, system, and/or tool 1700 configured and programmed to perform an undo operation and/or a software application or program uninstall operation according to one or more embodiments, and includes, according to one or more approaches, detecting, determining, and/or removing any dangling resources associated with the undo operation and/or or the software application uninstall process. Computing environment, system, platform, and/or tool 1700 according to one or more arrangements includes one or more programming modules that contain programming instructions to perform the process described herein, including operations and/or processes 300, 500, 800, 900, 1100, 1300, and 1600 discussed with reference to FIGS. 3-16. Computing environment, System, platform, and/or tool 1700 includes a Master Node 1705 and one or more Worker Nodes 1770, 1780, etc.

Master Node 1705 includes API server 1710 (e.g., Kubernetes API Server) which communicates with Worker Nodes 1770 and 1780, for example by receiving input from Worker Nodes 1770, 1780 and transmitting output to Worker Nodes 1770, 1780. A user or application makes a call against the API server 1710 to: capture resource dependency graphs (including capture of initial resource dependency graph, second resource dependency graph, and/or resulting (marked) resource dependency graph); perform the differential and/or comparison between the various resource dependency graphs (e.g., determine difference between initial resource dependency graph and second resource dependency graph); and delete the dangling resources (e.g., delete the nodes/resources in the resulting (marked) resource dependency graph).

The API server 1705 also communicates with Key Value Store 1712, Schedulers 1714, and Controllers 1716 to, in one or more embodiments, perform the disclosed techniques of undoing actions and/or deleting or removing dangling resources in response to or as part of a software uninstall operation. The API server 1705 receives input from and transmits output to the Key Value Store 1712, Schedulers 1714, and Controllers 1716. Worker Nodes 1770, 1780 include one or more Kubelet modules 1772, 1782 and one or more pods 1775, 1785. The Kubelet modules 1772, 1782 in Worker Nodes 1770, 1780 communicate with the API server 1705.

Master Node 1705 includes Undo/Uninstall module 1710, and submodules 1715 (See FIG. 17B) within Undo/Uninstall Module 1710, which is introduced by the disclosure to detect, identify, determine, remove and/or delete dangling resources for an undo action operation, perform an uninstall software application process, and/or provide a system, method, platform, tool, programming product to detect, identify, determine, remove, and/or delete dangling resources after an otherwise typical uninstall process to provide a more complete and cleaner uninstall process, preferably to return the computing environment, system, platform and/or tool 1700 to its original state before the targeted software application was installed. API server 1710 communicates with Undo-Uninstall Module 1710 (e.g., API Server 1705 receives input from and transmits output to the Undo/Uninstall module 1710), including in an approach with Graph Controller 1720.

FIG. 17B illustrates a block diagram of submodules 1715 within the Undo/Uninstall Module 1710. Undo/Uninstall Module 1710, including its submodules 1715, in an embodiment contain computer program product to perform the various operations and functions described for the various sub-modules 1715. The Graph Controller 1720 in an embodiment is the main entrance to the Undo/Uninstall Module 1710, including sub-modules 1715 within undo/uninstall module 1710. The Graph Controller 1720 is responsible for the orchestration of other sub-modules 1715 (e.g., programming modules) within the platform 1700 including within the Master Node 1705 and Undo/Uninstall Module 1710.

Master Node 1705 and Undo/Uninstall Module 1710 further includes Graph Builder 1722 responsible for building the various resource dependency graphs based upon different pipelines 1725 that support either explicit or implicit relationship analysis (e.g., ownership and/or association relationships), and stores the results (e.g., the resource dependency graphs) into a Graph Database (DB) 1724. In an embodiment, Undo/Uninstall Module 1710 contains one or more pipelines 1725 to collect data from different sources, e.g., resource manifests, container logs, service to service communication, and analyze the relationship and pass on the results as input to the Graph Builder 1722 to build the resource dependency graphs. Manifest Pipeline 1726 collects and parses the resource explicit relationships, e.g., ownerReference. Log Pipeline 1727 collects and parses the resource implicit relationships, e.g., association relationships, by analyzing the container logs. Topology Pipeline 1728 is also used to collect and parse the resource implicit relationships, including by analyzing the service to service communication that occurs at runtime.

The Drift Manager 1730 determines differences between two selected resource dependency graphs stored in the Graph Database 1724, and deletes the resources corresponding to the differential result, e.g., deletes the resulting (marked) resource dependency graph (the dangling resources/nodes). The Pattern Database (DB) 1732 stores patterns and relationships for use by the Graph Builder 1722 and in an approach stores known patterns that can assist Graph Builder 1722 determine what situations can be treated as a condensed component when scanning the resources in the cluster and building the graph.

In an approach where system 1700 is used in a process of undoing an action or uninstalling a software application, the Kubernetes API server 1705 in Master Node 1705 in an embodiment triggers the Graph Controller 1720 which in turns triggers the Graph Builder 1722 to build the initial resource dependency graph, for example according to 310 in method 300 in FIG. 3, before the action and/or the software installation. The Graph Builder 1722 receives data to build the initial resource dependency graph from the various pipelines including the Manifest Pipeline 1726, the Log Pipeline 1727, the Topology Pipeline 1728, and/or other pipelines 1725.

The initial resource dependency graph is stored in the Graph DB 1724. In response to an operation and/or instruction to undo an action or in response to an uninstall action or instruction, the Kubernetes API Server 1705 triggers the Graph Controller 1720 which triggers the Graph Builder 1722 in an embodiment to build the second resource dependency graph, for example according to 320 in method 300 in FIG. 3 and saves the second resource graph in Graph DB 1724. The building of the second resource dependency action can be performed before or after the software application uninstall process.

Drift Manager 1730 then determines the difference (e.g., makes a comparison) between the initial resource dependency graph saved to the Graph DB 1724 and the second resource dependency graph saved to Graph DB 1724 to arrive at the resulting (marked) resource dependency graph, for example according to 330 in method 300 in FIG. 3. Drift Manager 1730 then deletes the dangling nodes/resources which form the resulting (marked) resource dependency graph, preferably according to their hierarchical relationship where leaf nodes (e.g. dependent or subordinate resources) are removed or deleted before parent nodes or resources (e.g., resources from which other resources depend).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as new undo/uninstall code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 18. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods. This code and its operation has been described in connection with the example undo/uninstall module 1710 for performing an undo operation and/or a software application uninstall operation.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for performing at least one of a performance group consisting of undoing an action in and uninstalling a software application from a computing environment, the method comprising:

building an initial resource dependency graph for the computing environment, wherein the initial resource dependency graph identifies resources owned and associated with at least one of an action group consisting of the action and the software application before performing the performance group;

building a second resource dependency graph for the computing environment, wherein the second resource dependency graph identifies resources owned and associated with the action group after performing the performance group;

determining a resulting resource dependency graph to identify dangling resources in the computing environment after performing the performance group, wherein the resulting resource dependency graph is a difference in the identified resources between the initial resource dependency graph and the second resource dependency graph; and removing the dangling resources from the computing environment.

2. The computer-implemented method of claim 1, wherein removing the dangling resources is performed hierarchically where dependent dangling resources that are dependent upon other resources are removed before the other resources.

3. The computer-implemented method of claim 1, wherein building at least one of the initial resource dependency graph or the second resource dependency graph comprises:

building a resource ownership graph; and extending the resource ownership graph to include associations to form a resource dependency graph.

4. The computer-implemented method of claim 1, further comprising grouping eligible resources as condensed resources in at least one of the initial resource dependency graph or the second resource dependency graph.

5. The computer-implemented method of claim 4, wherein grouping the eligible resources as condensed resources in at least one of the initial resource dependency graph or the second resource dependency graph comprises:

scanning the initial resource dependency graph or the second resource dependency graph to identify nodes eligible to be condensed; and for each group of nodes identified as eligible to be condensed, create a new virtual node representing the group of nodes identified as eligible to be condensed and substitute the virtual node in the at least one of the initial resource dependency graph or the second resource dependency graph for the group of nodes identified as eligible to be condensed.

6. The computer-implemented method of claim 3, wherein building the resource ownership graph comprises:

scanning a target system in the computing environment for resource manifests stored in a resource datastore;

determining existing definitions that represent an explicit relationship between resources;

parsing resource explicit dependencies; and building the resource ownership graph.

7. The computer-implemented method of claim 6, wherein the resource ownership graph is built iteratively.

8. The computer-implemented method of claim 3, wherein extending the resource ownership graph to include associations to form the resource dependency graph comprises:

scanning container logs to identify associations among resources for implicit dependencies;

tracking service to service communications to identify associations among resources for implicit dependencies; and extending the resource ownership graph to include the identified associations to form the resource dependency graph.

9. The computer-implemented method of claim 1, wherein determining the resulting resource dependency graph to identify dangling resources comprises comparing the initial resource dependency graph to the second resource dependency graph.

10. The computer-implemented method of claim 1, wherein determining the resulting resource dependency graph to identify dangling resources further comprises:

for each node in the initial resource dependency graph determine whether the second resource dependency graph contains the same node;

for each node located in both the initial and second resource dependency graph, mark the node as visited;

for each node located only in the initial resource dependency graph, mark the node as ignored; and for each node located only in the second resource graph, identify the node as a dangling resource, wherein the dangling resources form the resulting resource dependency graph.

11. The computer-implemented method of claim 1, wherein removing the dangling resources comprises:

identify a leaf node in the resulting resource dependency graph;

delete the identified leaf node in the resulting resource dependency graph;

in response to the identified leaf node being successfully deleted, mark the identified leaf node as deleted and in response to the identified leaf node not being successfully deleted, mark the identified leaf node as failed;

determine whether any more nodes remaining in the resulting resource dependency graph;

in response to being one or more nodes remaining in the resulting resource dependency graph, determine whether any of the one or more remaining nodes are leaf nodes;

in response to being remaining leaf nodes, delete a next available remaining leaf node;

in response to being no remaining leaf nodes, delete a next available non-leaf node; and in response to being no remaining leaf nodes and no remaining non-leaf nodes, end the process of removing dangling resources.

12. The computer-implemented method of claim 1, wherein the resource dependency graphs are built without user interruption or code modification.

13. The computer-implemented method of claim 1, further comprising removing dangling resources by traversing the resulting resource dependency graph without a user specifying the order of deleting the dangling resources.

14. The computer-implemented method of claim 1, wherein the initial resource dependency graph comprises one or more nodes where each node identifies a resource and the initial resource dependency graph identifies resource dependencies;

the second resource dependency graph comprises one or more nodes where each node identifies a resource and the second resource dependency graph identifies resource dependencies; and the resulting resource dependency graph is determined by comparing the one or more nodes within the initial resource dependency graph to the one or more nodes within the second resource dependency graph to identify the dangling resources.

15. The computer-implemented method according to claim 14, wherein building the initial resource dependency graph or the second resource dependency graph comprises:

forming an initial resource ownership graph or a second resource ownership graph by:

scanning a target system in the computing environment for resource manifests stored in a resource datastore;

determining existing ownerReference definitions among resources for explicit dependencies;

parsing resource explicit dependencies; and forming the initial resource ownership graph or the second resource ownership graph; and extending the initial resource ownership graph or the second resource ownership graph to include associations to form the initial resource dependency graph or the second resource dependency graph by:

scanning container logs to identify associations among resources for implicit dependencies;

tracking service to service communications to identify associations among resources for implicit dependencies; and extending the initial resource ownership graph or the second resource ownership graph to include the identified associations.

16. The computer-implemented method according to claim 14, wherein determining the resulting resource dependency graph by comparing the one or more nodes within the initial resource dependency graph to the one or more nodes within the second resource dependency graph to identify the dangling resources, comprises:

for each node in the initial resource dependency graph determine the second resource dependency graph contains the same node;

for each node located in both the initial and second resource dependency graph, mark the node as visited;

for each node located only in the initial resource dependency graph, mark the node as ignored; and for each node located only in the second resource graph, identify the node as a dangling resource, wherein the dangling resources form the resulting resource dependency graph.

17. The computer-implemented method according to claim 14 wherein removing the dangling resources comprises:

identifying a leaf node in the resulting resource dependency graph;

deleting the identified leaf node in the resulting resource dependency graph;

in response to the identified leaf node being successfully deleted, marking the identified leaf node as deleted and in response to the identified leaf node not being successfully deleted, marking the identified leaf node as failed;

determining whether any more nodes remaining in the resulting resource dependency graph;

in response to being one or more nodes remaining in the resulting resource dependency graph, determining whether any of the one or more remaining nodes are leaf nodes;

in response to being remaining leaf nodes, deleting a next available remaining leaf node;

in response to being no remaining leaf nodes, deleting a next available non-leaf node; and in response to being no remaining leaf nodes and no remaining non-leaf nodes, ending the process of removing dangling resources.

18. The method of claim 1, wherein building the initial resource dependency graph being triggered by a user or a program.

19. The method of claim 1, wherein the building of the second resource dependency graph being triggered by a user or a program.

20. A computer-implemented method of uninstalling a software application, the method comprising:

forming an initial resource dependency graph before uninstalling the software application, wherein the initial resource dependency graph identifies resources in the computing environment owned and associated with the software application and comprises one or more nodes where each node identifies one of the resources and the initial resource dependency graph identifies resource dependencies;

forming a second resource dependency graph after uninstalling the software application, wherein the second resource dependency graph identifies resources in the computing environment owned and associated with the software application comprising one or more nodes where each node identifies one of the resources and the second resource dependency graph identifies resource dependencies;

form a resulting resource dependency graph by comparing the one or more nodes within the initial resource dependency graph to the one or more nodes within the second resource dependency graph to identify dangling resources; and remove the dangling resources, wherein forming the initial resource dependency graph or the second resource dependency graph comprises:

forming an initial resource ownership graph and a second resource ownership graph by:

scanning a target system in the computing environment for resource manifests stored in a resource datastore;

determining existing ownerReference definitions among resources for explicit dependencies;

parsing resource explicit dependencies; and forming the initial resource ownership graph and the second resource ownership graph; and extending the initial resource ownership graph and the second resource ownership graph to include associations to form the initial resource dependency graph and the second resource dependency graph by:

scanning container logs to identify associations among resources for implicit dependencies;

tracking service to service communications to identify associations among resources for implicit dependencies; and extending the initial resource ownership graph and the second resource ownership graph to include the respective identified associations.

\* \* \* \* \*